(12) United States Patent
Thomas

(10) Patent No.: US 12,322,136 B2
(45) Date of Patent: Jun. 3, 2025

(54) METHODS, SYSTEMS, APPARATUS, AND ARTICLES OF MANUFACTURE FOR CAMERA IMAGE STREAM SELECTION FOR ELECTRONIC USER DEVICES

(71) Applicant: Intel Corporation, Santa Clara, CA (US)

(72) Inventor: Tigi Thomas, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 741 days.

(21) Appl. No.: 17/483,585

(22) Filed: Sep. 23, 2021

(65) Prior Publication Data
US 2022/0012913 A1   Jan. 13, 2022

(51) Int. Cl.
*G06T 7/73* (2017.01)
*G06V 40/16* (2022.01)

(52) U.S. Cl.
CPC .............. *G06T 7/75* (2017.01); *G06V 40/166* (2022.01); *G06T 2207/10016* (2013.01); *G06T 2207/20081* (2013.01)

(58) Field of Classification Search
CPC .... G06V 10/82; G06V 40/169; G06V 40/166; G06T 7/70; G06T 7/75; G06T 2207/20081; G06T 2207/30201; G06T 2207/20084; G06T 2207/10016; G06T 2207/20076
See application file for complete search history.

(56) References Cited

U.S. PATENT DOCUMENTS

| | | | |
|---|---|---|---|
| 9,491,374 B1 * | 11/2016 | Avrahami | G06V 40/20 |
| 11,024,002 B2 | 6/2021 | Isikdogan et al. | |
| 2016/0286120 A1 | 9/2016 | Kuo et al. | |
| 2020/0401793 A1 | 12/2020 | Leung et al. | |
| 2021/0112238 A1 | 4/2021 | Bylicka et al. | |
| 2022/0400216 A1 * | 12/2022 | Wang | G10L 25/78 |
| 2023/0298204 A1 | 9/2023 | Wang et al. | |

OTHER PUBLICATIONS

Avrahami, Daniel, Eveline van Everdingen, and Jennifer Marlow. "Supporting Multitasking in Video Conferencing using Gaze Tracking and On-Screen Activity Detection." Proceedings of the 21st International Conference on Intelligent User Interfaces. 2016. (Year: 2016).*

* cited by examiner

*Primary Examiner* — Vu Le
*Assistant Examiner* — Tracy Mangialaschi
(74) *Attorney, Agent, or Firm* — Hanley, Flight & Zimmerman, LLC

(57) ABSTRACT

Methods, apparatus, systems, and articles of manufacture for camera image stream selection for electronic user devices are disclosed. An example apparatus disclosed herein includes head pose estimation circuitry to determine, based on first image data and second image data, (a) a first orientation of a user relative to a first camera and (b) a second orientation of the user relative to a second camera, the first image data associated with a first video stream output by the first camera and the second video data associated with a second video stream output by the second camera, and video stream selection circuitry to select one of the first video stream or the second video stream based on the first orientation and the second orientation.

25 Claims, 13 Drawing Sheets

METHODS, SYSTEMS, APPARATUS, AND ARTICLES OF MANUFACTURE FOR CAMERA IMAGE STREAM SELECTION FOR ELECTRONIC USER DEVICES

FIELD OF THE DISCLOSURE

This disclosure relates generally to video processing and, more particularly, to methods, systems, apparatus, and articles of manufacture for camera image stream selection for electronic user devices.

BACKGROUND

During a video conference, a camera of an electronic device captures images of a user. A video stream including the images of the user is output for presentation by electronic device(s) associated with other participant(s) in the video conference.

BRIEF DESCRIPTION OF THE DRAWINGS

The figures are not to scale. In general, the same reference numbers will be used throughout the drawing(s) and accompanying written description to refer to the same or like parts.

Figure 1:
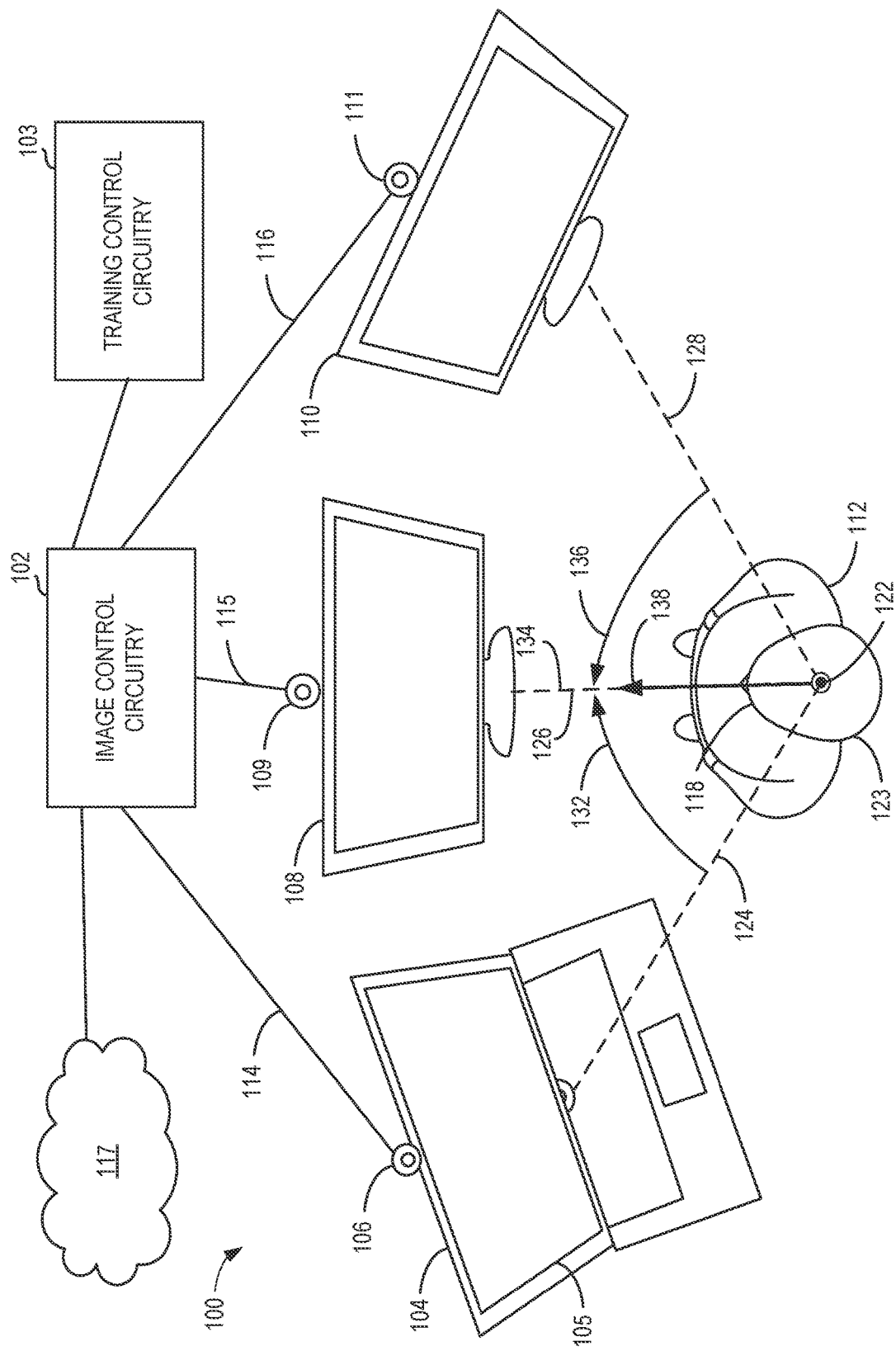
FIG. 1 illustrates an example system including two or more cameras, example training circuitry for training neural network models to detect a face of a user in image data generated by the cameras, and example image control circuitry for selecting an image stream associated with the respective cameras for output based on an orientation of the face of the user in accordance with teachings of this disclosure.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

An electronic user device (also referred to herein as a device or a user device) such as a laptop, a tablet, or a smartphone can include a camera to capture images and/or videos of a user of the device and/or of an environment in which the device is located. The user device can include user applications such as a video conferencing application installed thereon. During a video conference, images of the user and/or the environment are captured via the camera of the user device and are output for presentation at electronic device(s) associated with other participant(s) of the video conference.

In some instances, the user may interact with two or more user devices while participating in a video conference. For example, a user may be using a desktop computer that includes a primary display (e.g., a first monitor) and one or more secondary displays (e.g., a second monitor). The user may interact with content displayed on each display. Each of the displays can include a camera (e.g., a built-in camera, a camera externally mounted to the display). However, during the video conference, only one of the cameras may be activated to capture images of the user. For example, the camera associated with the primary display (e.g., the first monitor) may be activated to generate a video stream during the video conference. As a result, when the user moves at least a portion of his or her body relative to the primary display camera to interact with the secondary display, a face of the user may be partially occluded and/or may at least partially exit a field of view of the primary display camera. For example, the user may turn his or her face away from the primary display camera to view content on the secondary display. As a result, the other participant(s) in the video conference may view, for instance, a side profile of the user's face while the user's gaze is directed toward the secondary display, which can result in an unnatural conversational experience.

In some cases, the user device enables the user to switch between multiple cameras associated with the user device (e.g., a desktop including multiple displays) and/or with the user device and other user devices (e.g., a desktop and an electronic tablet) to change which of the cameras is considered the primary camera. However, manually switching between cameras (e.g., via user input(s) at the respective device(s)) can be disruptive to the user and/or the other participants during the video conference.

Disclosed herein are example systems, apparatus, and methods that enable automated switching of video streams between two or more cameras associated with electronic user device(s) and/or display(s) (e.g., monitors). In examples disclosed herein, image control circuitry analyzes image streams such as video streams generated by two or more cameras during, for instance, a video conference to detect a face of the user in the respective video streams and to determine an orientation of the face. For instance, the example image control circuitry determines an angle (e.g., a yaw angle) of the detected face relative to the respective cameras. In some examples, the angle is measure with respect to a feature of the user's face such as the user's nose as detected in the image data.

Examples disclosed herein generate attention scores for the respective cameras that represent a likelihood that the user is facing a particular camera. The attention scores can be generated based on a comparison of the yaw angles of the user's face (e.g., feature(s) of the user's face) relative to the respective cameras to a threshold yaw angle. In some examples, the attention scores are generated based on a duration for which the yaw angle associated with a particular camera satisfies the threshold yaw angle, which can indicate that the user is facing the particular camera for an extended period of time.

In examples disclosed herein, the image control circuitry selects a video stream associated with a particular camera for output as the video stream to be transmitted for presentation during the video conference based on the attention scores. For instance, the example image control circuitry can select the video stream associated with the camera assigned the highest attention score as the video stream for output because of the likelihood that the user is facing that camera as compared to the other cameras. As a result, examples disclosed herein prevent or substantially reduce instances in which image data including occluded and/or distorted views of the user are presented during a video conference. Examples disclosed herein analyze the video streams from the respective cameras during the video conference and assign attention scores to the cameras to determine if there are any changes in the orientation and/or position of the user's face. Examples disclosed herein automatically select the video stream associated with the camera having the highest attention score, thereby providing for automated switching between video streams based on the direction of the user's face when interacting with multiple displays.

Although examples disclosed herein are discussed in connection with the video streams, examples disclosed herein could additionally or alternatively be used in connection with other types of image data, such as still images.

FIG. 1 illustrates an example system 100 including two or more cameras to capture image data of a user and example image control circuitry 102 to select a video stream associated with one of the cameras for output during, for instance, a video conference and/or other video recording. In the illustrated example of FIG. 1, the image control circuitry 102 is communicatively coupled to example training control circuitry 103. The training control circuitry 103 is to generate one or more machine learning models for use by the image control circuitry 102 in analyzing the video streams, as disclosed herein.

The example system 100 of FIG. 1 includes a first device 104. In the example of FIG. 1, the first device 104 is an electronic user device. For instance, the first device 104 is a laptop, however, the first device 104 can include other types of user devices, such as a desktop computer, a smartphone, an electronic tablet, etc. The first device 104 includes a display 105 (e.g., a display screen). The first device 104 includes a first camera 106. In the example of FIG. 1, the first camera 106 is a video camera. The first camera 106 can be a built-in camera. In other examples, the first camera 106 is an accessory that can be coupled to (e.g., mounted to) the first device 104.

In the example of FIG. 1, the first device 104 is communicatively coupled to one or more other devices, which can include one or more display devices and/or one or more other electronic devices. For example, in FIG. 1, the first device 104 is communicatively coupled to a second device 108, which, in this example, includes an external monitor that can present content in addition to the content presented on the display 105 of the first device 104. Also, in the example of FIG. 1, the first device 104 is communicatively coupled to a third device 110. In this example, the third device 110 includes an external monitor to present content in addition to the content presented via the display 105 of the first device 104 and the second device 108. Although in the example of FIG. 1, the first device 104 is shown as communicatively coupled to two display devices, in other examples, the device 104 is communicatively coupled to other user devices (e.g., a tablet, a smartphone) and/or a combination of display device(s) and user device(s). The first device 104 of FIG. 1 can be coupled to additional or fewer devices (e.g., display device(s) such as external monitor(s), other electronic user device(s), etc. than shown in FIG. 1.

The second device 108 includes a second camera 109, which includes a video camera. The second camera 109 can be a built-in camera or an external accessory for the to the second device 108. The third device 110 includes a third camera 111, which may be a built-in camera or an external accessory to generate image data (e.g., video data).

As shown in FIG. 1, a user 112 interacts with the devices 104, 108, 110. In the example of FIG. 1, the first device 104 includes a video conferencing application installed thereon. During the video conference, the first camera 106 of the first device 104 generates first image data (e.g., first video frame(s)) that defines a first video stream signal 114. Also, the second camera 109 of the second device 108 generates second image data (e.g., second video frames) that defines a second video stream signal 115. The third camera 111 of the third device 110 generates third image data (e.g., third video frames) that defines a third video stream signal 116. In the example of FIG. 1, one or more of the video stream signals 114, 115, 116 may include image data capturing at least a portion of the user 112 based on a position of the user 112 relative to each camera 106, 109, 111. Although examples disclosed herein are discussed in connection with the video stream signals 114, 115, 116, examples disclosed herein could additionally or alternatively be used in connection with other types of image data, such as still images.

In the illustrated example of FIG. 1, the first video stream signal 114, the second video stream signal 115, and the third video stream signal 116 are processed by the image control circuitry 102. In some examples, the image control circuitry 102 is implemented by executable instructions executed on processor circuitry of the first device 104. In other examples, the image control circuitry 102 is implemented by processor circuitry of the second device 108, processor circuitry of the third device 110 (e.g., in examples where the second device 108 and/or the third device 110 include an electronic user device), and/or processor circuitry of another user device such as a wearable device. In other examples, the image control circuitry 102 is implemented by one or more cloud-based device(s) 117 (e.g., one or more server(s), processor(s), and/or virtual machine(s)). In other examples, the image control circuitry 102 is implemented by dedicated circuitry located on the first user device 104, the second user device 108, and/or the third user device 110. These components may be implemented in software, hardware, or in any combination of two or more of software, firmware, and/or hardware.

In the illustrated example of FIG. 1, the image control circuitry 102 analyzes the image data from the respective first, second, and third video stream signals 114, 115, 116 to determine an orientation (e.g., a yaw angle) of a face 118 of the user 112 with respect to each of the cameras 106, 109, 111. The example image control circuitry 102 implements one or more neural network models trained by the training control circuitry 103 to detect the face 118 of the user 112 in the video frames defining the respective video stream signals 114, 115, 116. The image control circuitry 102 extracts one or more facial reference features from the detected face in the image data as a reference marker for determining the orientation of the face of the user 112. For example, the image control circuitry 102 may identify a nose of the user 112 as the facial reference feature for the face orientation analysis. In other examples, the facial reference feature can include a nose bridge, a right eye, a left eye, a chin, etc. of the user 112.

During a video conference, the user 112 may turn his or her face 118 to, for instance, view content presented on the displays of the respective devices 104, 108, 110. For instance, in the illustrated example of FIG. 1, the user 112 is facing the second camera 109 of the second device 108 such that image data generated by the second camera 109 captures a front profile of the user's face 118. The face 118 of the user 112 (e.g., the user's nose) is disposed at an angle relative to the first camera 106 of the first device 104 and the third camera 111 of the third device 110. Thus, the image data generated by the first camera 106 may capture a (e.g., left) side of the user's face 118 and the image data generated by the third camera 111 may capture a portion of the opposite side of the user's face 118.

In the example of FIG. 1, the user 112 turns his or her head 123 and, thus, face 118 about a yaw axis 122 when viewing and/or otherwise interacting with the respective devices 104, 108, 110. In the example of FIG. 1, the yaw axis 122 extends out of the page, and the yaw axis 122 is approximately centrally positioned with respect to the head 123 of the user 112. In other examples, a location of the yaw axis 122 may be different (e.g., in front of the face 118 of the user 112, at a tip of the nose of the user 112, etc.). For illustrative purposes, in the example of FIG. 1, a first camera axis (e.g., a first central axis) 124 extends between the first camera 106 and the yaw axis 122, a second camera axis (e.g., a second central axis) 126 extends between the second camera 109 and the yaw axis 122, and a third camera axis (e.g., a third central axis) 128 extends between the third camera 111 and the yaw axis 122.

The image control circuitry 102 executes one or more neural network models to detect the face 118 of the user 112 in each of the video frames associated with the first video stream signal 114, the second video stream signal 115, and the third video stream signal 116. Based on the neural network analysis, the image control circuitry 102 identifies facial feature(s) of the user 112 such as a nose, eye(s), chin, etc. In the example of FIG. 1, the image control circuitry 102 executes neural network model(s) to predict the angle at which the facial feature is disposed relative to each of the cameras 106, 109, 111 based on the image data from the respective video stream signals 114, 115, 116 associated with each camera 106, 109, 111. As disclosed herein, the neural network model(s) are trained by the training control circuitry 103 using image data showing users with their heads and, thus, facial features such as the nose, eyes, chin, in different orientations (e.g., head turned upward, head turned to the left, etc.). The training data can indicate the yaw angles at which the facial features of the users are disposed for head pose estimation. In some examples, during training of the neural network model(s), the training control circuitry 103 determines relative distances between two or more facial features (e.g., the nose and the chin). In such examples, the training control circuitry 103 determines correlations between the relative distances and labeled yaw angles of the facial features. In some examples, the training control circuitry 103 trains the neural network model(s) based on the correlations such that, when executed, the neural network model(s) output yaw angles based on distances between the facial features identified in the video stream signals 114, 115, 116 by the image control circuitry 102.

As a result of execution of the neural network model(s), the image control circuitry 102 determines a first yaw angle 132, which for illustrative purposes, is represented in FIG. 1 as a yaw angle between, for example, a nose of the user 112 and the first camera axis 124. The image control circuitry 102 determines a second yaw angle 134, which, for illustrated purposes in FIG. 1, is represented as a yaw angle between the nose of the user 112 and the second camera axis 126. In this example, as a result of the neural network analysis, the image control circuitry 102 determines that the user 112 is facing substantially straight ahead such that the yaw axis between the nose of the user 112 and the second camera axis 126 of the second camera 109 is defined as 0 degrees (e.g., within ±1 degree). The image control circuitry 102 determine a third yaw angle 136, which, for illustrative purposes, is represented in FIG. 1 as a yaw angle between the nose of the user 112 and third camera axis 128. In this example, yaw angles are negative in a clockwise direction about the yaw axis 122, and the yaw angles are positive in a counterclockwise direction about the yaw axis 122.

The example image control circuitry 102 compares the yaw angles 132, 134, 136 to a yaw angle threshold. The yaw angle threshold can indicate that, for instance, a yaw angle between 0≤±30 degrees is indicative of the face 118 of the user 112 (as represented by the facial reference feature) being oriented toward a particular one of the cameras 106, 109, 111 (e.g., a camera plane associated with the respective cameras 106, 109, 111 onto which the face 118 of the user 112 is projected). In some examples, the image control circuitry 102 determines a duration of time for which the yaw angle threshold is satisfied based on the image data for each of the video stream signals 114, 115, 116. The image control circuitry 102 assigns an attention score to each of the cameras 106, 109, 111 based on the yaw angle 132, 134, 136 determined from the video stream signals 114, 115, 116 associated with each camera 106, 109, 111. The attention score is indicative of an orientation of the face of the user 112 relative to the cameras 106, 109, 111 (e.g., to respective camera planes associated with the cameras 106, 109, 111). For instance, a smaller yaw angle as determined by the image control circuitry 102 based on image data from a respective camera 106, 109, 111 can indicate that the face 118 of the user 112 is oriented toward the corresponding camera 106, 109, 111 from which the image data was generated. Thus, the attention scores represent a likelihood that the user 112 is forward-facing or substantially forward-facing with respect to a particular camera 106, 109, 111 (e.g., with respect to a camera plane of the camera onto which the face 118 of the user 112 is projected). Put another way, the attention score can represent a level of engagement of the user 112 with the devices 104, 108, 110 associated with the respective cameras 106, 109, 111 at a given time.

For instance, in the example of FIG. 1, the image control circuitry 102 determines that the second yaw angle 134 with respect to the second camera 109 is the smallest as compared to the first yaw angle 132 and the third yaw angle 136. The image control circuitry 102 can also determine that the second yaw angle 134 has been maintained or substantially maintained for thirty seconds. In this example, the image control circuitry 102 determines that the user 112 is oriented toward the second camera 109, as represented by arrow 138 in FIG. 1. As a result, the image control circuitry 102 assigns the second camera 109 a higher attention score than the attention scores assigned to the first camera 106 or the second camera 111. The image control circuitry 102 selects the video stream signal 115 from the second camera 109 to be output for transmission to the electronic devices of the other participants in the video conference (e.g., transmission via the cloud 117 using one or more protocol(s) such as voice-over-internet protocol(s)) associated with the video conferencing application).

In examples disclosed herein, the image control circuitry 102 selects the video stream signal 114, 115, 116 associated with the camera 106, 109, 111 assigned the highest attention score to be output as the video stream that is transmitted for presentation at user devices associated with other participants of the video conference. As a result, the video stream signal 114, 115, 116 selected for output is includes or is likely to include a forward-facing profile of the face 118 of the user 112.

During the video conference, the orientation of the face 118 of the user 112 relative to the cameras 106, 109, 111 can change as the user 112 directs his or her attention to the different devices 104, 108, 110. The example image control circuitry 102 analyzes the video stream signals 114, 115, 116 associated with each camera 106, 109, 111 during the video conference to detect the face 118 of the user 112 in the image data from each camera 106, 109, 111, measure the yaw angles, assign the attention scores to the cameras 106, 109, 111, and determine whether there is a change in the camera 106, 109, 111 associated with the highest attention score. In some examples, the image control circuitry 102 analyzes the image data generated by each camera 106, 109, 111 in substantially real-time as the video stream signals 114, 115, 116 are received by the image control circuitry 102. (As used herein "substantially real time" refers to occurrence in a near instantaneous manner recognizing there may be real world delays for computing time, transmission, etc. Thus, unless otherwise specified, "substantially real time" refers to real time+/−1 second). In other examples, the image control circuitry 102 analyzes the image data periodically (e.g., every 10 seconds, every 30 seconds, etc.) to determine changes in the orientation of the user's face 118 relative to the cameras 106, 109, 111. The image control circuitry 102 selects the video stream signal 114, 115, 116 associated with the camera 106, 109, 111 having the highest attention score. Thus, the image control circuitry 102 provides for switching between the video stream signals 114, 115, 116 to cause one of the video stream signals 114, 115, 116 that most likely includes a forward-facing or substantially forward-facing view of the user's face 118 to be output.

Figure 2:
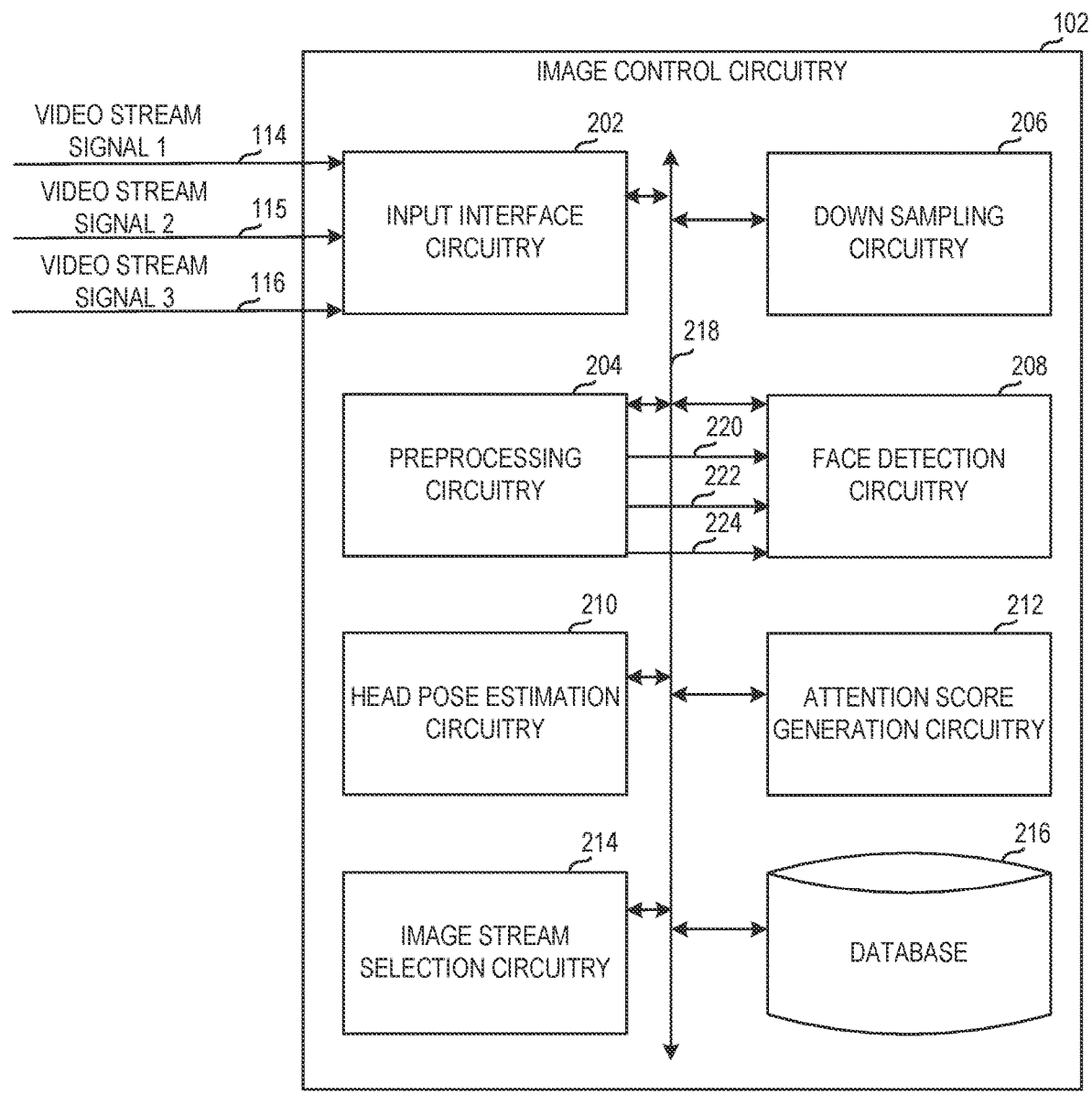
FIG. 2 is a block diagram of the example image control circuitry of FIG. 1.

FIG. 2 is a block diagram of the example image control circuitry 102 of FIG. 1. As mentioned above, the image control circuitry 102 is structured to select a video stream signal from two or more of the video stream signals 114, 115, 116 associated with the respective cameras 106, 109, 111 of FIG. 1 based on an orientation of the face 118 of the user 112 relative to each camera 106, 109, 111. In the example of FIG. 2, the image control circuitry 102 is implemented by one or more of processor circuitry of the first device 104, processor circuitry of the second device 108, processor circuitry of the third device 110 (e.g., in examples where the respective devices 104, 108, 110 are electronic user devices), and/or cloud based device(s) (e.g., server(s), processors(s), and/or virtual machine(s) in the cloud 117 of FIG. 1 executing instructions). In some examples, some of the video stream analysis is implemented by the image control circuitry 102 via a cloud-computing environment and one or more other parts of the analysis is implemented by the processor circuitry of the user device(s) 104, 108, 110 and/or processor circuitry of another user device such as a wearable device. In some examples, the image control circuitry 102 is implemented by special purpose circuitry.

In the illustrated example of FIG. 2, the image control circuitry 102 includes example input interface circuitry 202, example preprocessing circuitry 204, example down sampling circuitry 206, example face detection circuitry 208, example head pose estimation circuitry 210, example attention score generation circuitry 212, example image stream selection circuitry 214, and an example database 216. In the illustrated example of FIG. 2, any of the input interface circuitry 202, the preprocessing circuitry 204, the down sampling circuitry 206, the face detection circuitry 208, the head pose estimation circuitry 210, the attention score generation circuitry 212, the image stream selection circuitry 214, and/or the database 216 can communicate via an example communication bus 218. Also, in some examples, the image control circuitry 102 includes the database 216 as shown in FIG. 1; in other examples, the database 216 is in a location accessible to the image control circuitry 102.

In examples disclosed herein, the communication bus 218 may be implemented using any suitable wired and/or wireless communication. In additional or alternative examples, the communication bus 218 includes software, machine readable instructions, and/or communication protocols by which information is communicated among the input interface circuitry 202, the preprocessing circuitry 204, the down sampling circuitry 206, the face detection circuitry 208, the head pose estimation circuitry 210, the attention score generation circuitry 212, the image stream selection circuitry 214, and/or the database 216.

In the illustrated example of FIG. 2, the input interface circuitry 202 is communicatively coupled to the first, second, and third devices 104, 108, 110 of FIG. 1 to receive and/or otherwise obtain the video stream signals 114, 115, 116 generated by the corresponding cameras 106, 109, 111 associated with the devices 104, 108, 110. In some examples, the input interface circuitry 202 provides the video stream signals 114, 115, 116 to the database 216 for storage therein. The example database 216 of FIG. 2 is implemented by any memory, storage device and/or storage disc for storing data such as, for example, flash memory, magnetic media, optical media, solid state memory, hard drive(s), thumb drive(s), etc. Furthermore, the data stored in the example database 216 may be in any data format such as, for example, binary data, comma delimited data, tab delimited data, structured query language (SQL) structures, etc. While, in the illustrated example, the example database 216 is illustrated as a single device, the example database 216 and/or any other data storage devices described herein may be implemented by any number and/or type(s) of memories.

The example down sampling circuitry 206 reduces a frame sampling rate of the respective video stream signals 114, 115, 116 and/or modifies a resolution of the video frames. In some examples, the video stream signal(s) 114, 115, 116 are captured at a high resolution (e.g., 1280×720 pixels) and a high frame rate (e.g., 30 frames per second (FPS)) based on, for example, settings associated with a video conferencing application. In the example of FIG. 2, the down sampling circuitry 206 reduces a sampling rate of the respective video stream signals 114, 115, 116 from, for instance, 30 FPS to 5 FPS. As a result of the down sampling, the down sampling circuitry 206 generates first video frame(s) 220 from the first video stream signal 114, second video frame(s) 222 from the second video stream signal 115, and third video frame(s) 224 from the third video stream signal 116. In some examples, the down sampling circuitry 406 can decrease a resolution of the processed video frame(s) 220, 222, 224 (e.g., from 1280×720 pixels to 300×300 pixels). By reducing the frame rate and/or frame size of the video stream signals 114, 115, 116, the down sampling circuitry 206 reduces computational time and/or power with respect to the image analysis without sacrificing accuracy in the detection of the orientation of the user's face 118.

The example preprocessing circuitry 204 analyzes the video frame(s) 220, 222, 224 with respect to ambient lighting in the environment in which the user 112 is located and/or glare. For example, the preprocessing circuitry 204 executes one or more image processing algorithms to analyze light in the video frame(s) 220, 222, 224. In some examples, the preprocessing circuitry 204 can executed one or more image processing algorithms to adjust the lighting in the image data. In other examples, if the preprocessing circuitry 204 determines that the image data was captured in inadequate lighting conditions for performing face detection analysis, the preprocessing circuitry 204 can generate an alert to be output via the device(s) 104, 108, 110 from which the video stream signals(s) 114, 115, 116 identified as including inadequate lighting was received. In such examples, if the preprocessing circuitry 204 identifies one or more of the video stream signals 114, 115, 116 as associated with inadequate lighting, the image control circuitry 102 will refrain from further analysis of the identified video stream signal(s) 114, 115, 116 to conserve computing resources. The image processing algorithm(s) to assess lighting conditions and/or rule(s) with respect to ambient lightening thresholds can be stored in the database 216.

If the preprocessing circuitry 204 determines that the image data in the video stream signals 114, 115, 116 were captured under sufficient lighting conditions, the example face detection circuitry 208 analyzes each of the video frames 220, 222, 224 extracted from the respective video stream signals 114, 115, 116 to detect face(s) (i.e., human face(s)) in the video frames 220, 222, 224. In the example of FIG. 2, the face detection circuitry 208 executes one or more neural network model(s) to detect face(s) in the respective video frame(s) 220, 222, 224. In particular, the example face detection circuitry 208 of FIG. 2 executes one or more face detection model(s) to identify face(s) in the video frame(s) 220, 222, 224 and to output bounding boxes at the predicted location(s) of the face(s) in the video frame(s) 220, 222, 224. As disclosed in connection with FIG. 3, the face detection model(s) are generated as a result of neural network training performed by the training control circuitry 103. The face detection model(s) are stored in the database 216.

In some examples, an area of each of the bounding boxes is based on a size of the detected face and/or a proximity of the detected face to the first camera 106, the second camera 109, or the third camera 111 that captured the video frame(s) 220, 222, 224. In some examples, the face detection circuitry 208 also determines confidence levels associated with the bounding boxes, where each of the confidence levels represents a confidence (e.g., a likelihood, a probability) that the corresponding bounding box contains a face of a user. In some such examples, the face detection circuitry 208 identifies ones of the bounding boxes having confidence levels that satisfy a detection confidence threshold (e.g., 90%, 95%, etc.). In examples which the face detection circuitry 208 detects two or more faces in the video frame(s) 220, 222, 224, the face detection circuitry 208 can filter the faces to select a face for further analysis based on, for example, a size of the bounding boxes, the confidence threshold, etc. For example, the face detection circuitry 208 can select the bounding box with the largest area for further analysis. Thus, when multiple bounding boxes in the video frame(s) 220, 222, 224 satisfy the face detection threshold, the face detection circuitry 208 selects the bounding box with the largest area as most likely representative of a user who is speaking while interacting with a particular user device 104, 108, 110. In some examples, the face detection circuitry 208 provides locations and/or sizes of the bounding boxes to the database 216 for storage therein.

In the example of FIG. 2, the face detection circuitry 208 executes the face detection model(s) to identify one or more facial features of the user (e.g., the user identified as the primary speaker) based on the image data from the video frames 220, 222, 224. For example, as a result of execution of the face detection model(s), the face detection circuitry 208 identifies a location of a facial feature such as a nose of the user 112 in each of the video frames 220, 222, 224. The facial feature(s) can include other portions of the face 118 of the user 112 such as the chin, the right eye, the left eye, the nose bridge, etc.

The example head pose estimation circuitry 210 determines (e.g., estimates, predicts) an orientation of the face 118 of the user 112 in each of the video frames 220, 222, 224 derived from the corresponding video stream signals 114, 115, 116. In particular, the head pose estimation circuitry 210 determines a yaw angle (e.g., the first yaw angle 132, the second yaw angle 134, and/or the third yaw angle 136 of FIG. 1) of the facial feature(s) (e.g., nose) of the user 112 relative to the first, second, and third cameras 106, 109, 111. In some examples, the head pose estimation circuitry 210 also determines a pitch angle and/or a roll angle of the face 118 of the user 112 (e.g., using the identified facial feature).

In some examples, the head pose estimation circuitry 210 receives and/or otherwise obtains the bounding boxes generated by the face detection circuitry 208 for each of the video frames 220, 222, 224, where each of the bounding boxes corresponds to a detected face and includes the identified facial feature(s) (e.g., for the primary user or speaker). The head pose estimation circuitry executes one or more head pose estimation model(s) (e.g., head pose estimation neural network model, a second neural network model) to determine a yaw angle of the particular facial feature(s). As disclosed herein, the head pose estimation model(s) can be trained by the training control circuitry 103 of FIG. 1 based on images of faces for which locations of one or more facial reference features and orientations (e.g., yaw, pitch, and roll) of the facial feature(s) are labelled and/or otherwise known. As a result of executing the head pose estimation model(s), the head pose estimation circuitry 210 determines the yaw angle of the facial feature(s) (e.g., the nose) in the detected face of the bounding boxes of each of the video frames 220, 222, 224. For instance, the head pose estimation circuitry 210 determines (e.g., predicts, estimates) the first yaw angle 132 of FIG. 1 based on a facial feature (e.g., the nose) identified in a bounding box in the first video frame 220 and execution of the head pose estimation model(s). The head pose estimation circuitry 210 determines the second yaw angle 132 based on the facial feature identified in a bounding box in the second video frame 222 and execution of the head pose estimation model(s). The head pose estimation circuitry 210 determines the third yaw angle 134 based on the facial feature identified in a bounding box in the third video frame 224 and execution of the head pose estimation model(s).

The example attention score generation circuitry 212 generates attention scores for the cameras 106, 109, 111 of FIG. 1 based on the yaw angles determined by the head pose estimation circuitry 210 using the video frames 220, 222, 224 of the respective the video stream signals 114, 115, 116. For example, the attention score generation circuitry 212 generates a first attention score for the first camera 106 based on the yaw angle(s) of the facial feature as determined from the first video frame(s) 220 of the first video stream signal 114, a second attention score for the second camera 109 based on the yaw angle(s) of the facial feature as determined from the second video frame(s) 222 of the second video stream signal 115, and a third attention score for the third camera 111 based on the yaw angle(s) of the facial feature as determined from the third video frame(s) 224 of the third video stream signal 116.

In the example of FIG. 2, the attention score generation circuitry 212 determines the attention scores by comparing the yaw angles associated with each of the video frame(s) 220, 222, 224 to a yaw angle threshold. For instance, the threshold yaw angle can be defined as 30 degrees (e.g., based on user input(s) stored in the database 216). However, in other examples, a different threshold yaw angle (e.g., 15 degrees, 45 degrees, etc.) can be used.

The attention score generation circuitry 212 determines that the first yaw angle 132 satisfies the threshold yaw angle when, for example, the first yaw angle 132 is within a range of $0 \leq X \leq 30$ degrees, where X is the first yaw angle 134. In some examples, the attention score generation circuitry 212 monitors a duration of time for which the first yaw angle 132 satisfies the yaw angle threshold. The attention score generation circuitry 212 generates a first attention score for the first camera 109 based on the comparison of the first yaw angle 132 to the yaw angle threshold and, in some instances, a duration of time for which first yaw angle 132 satisfies the yaw angle threshold (e.g., where the duration of time serves as a weighing factor). For instance, the attention score generation circuitry 212 assigns a higher attention score to the first camera 109 when the first yaw angle 132 satisfies the yaw angle threshold and a lower attention score to the first camera 109 when the first yaw angle 132 does not satisfy the yaw angle threshold. If the first yaw angle satisfies the yaw angle threshold, the attention score generation circuitry 212 assigns a higher attention score the first camera 109 when the first yaw angle 132 is smaller (e.g., 2 degrees, which can indicate that the user 112 is facing the first camera 109) as compared to when the first yaw angle 132 is larger (e.g., 25 degrees, which can indicate that the user 112 is at least partially turned away from the first camera 109). The attention score generator circuitry 212 can adjust the attention score for the first camera 109 based on the duration of time for which the yaw angle threshold is satisfied (e.g., increase the attention score the longer duration for which the threshold is satisfied)

The attention score generation circuitry 212 determines that the second yaw angle 134 satisfies the threshold yaw angle when, for example, the second yaw angle 134 is within a range of $0 \leq Y \leq 30$ degrees, wherein Y is the second yaw angle 134. The attention score generation circuitry 212 generates a second attention score for the first camera 111 based on the comparison of the second yaw angle 134 to the yaw angle threshold and, in some instances, a duration of time for which second yaw angle 134 satisfies the yaw angle threshold, as disclosed in connection with the first camera 109.

The attention score generation circuitry 212 determines that the third yaw angle 136 satisfies the threshold yaw angle when, for example, the second yaw angle 134 is within a range of $0 \leq Y \leq 30$ degrees, wherein Y is the second yaw angle 134). The attention score generation circuitry 212 generates a second attention score for the first camera 111 based on the comparison of the second yaw angle 134 to the yaw angle threshold and, in some instances, a duration of time for which third yaw angle 134 satisfies the yaw angle threshold, as disclosed in connection with the first camera 109.

In the example of FIG. 2, the attention scores represent engagement of the user 112 with the respective cameras 106, 109, 111 (e.g., the respective camera planes). The attention score generation circuitry 212 determines an orientation of the user 112 with respect to the cameras 106, 109, 111 based on the attention scores. For instance, the attention score generation circuitry 212 determines that the user 112 is oriented toward (e.g., forward-facing) a particular camera 106, 109, 111 based on the camera 106, 109, 111 that was assigned the highest attention score. Thus, attention scores serve as proxies for determining engagement of the user 112 with a particular device 104, 108, 110.

In some examples, the attention score generation circuitry 212 assigns an initial attention score (e.g., zero) for each of the first, second, and third attention scores corresponding to the respective first, second, and third cameras 106, 109, 111. Although the initial attention score is assigned a value of zero in this example, a different initial attention score value may be used instead. In some examples, the attention score generation circuitry 212 implements a first integrator, a second integrator, and a third integrator to calculate the first, second, and third attention scores, respectively, as functions of time. For example, the first integrator increments the first attention score based on an increment factor (e.g., an attack factor) when the user 112 is determined by the attention score generation circuitry 212 to be oriented towards the first camera 106 (e.g., as determined based on the yaw angle measured by the head pose estimation circuitry 210), and the first integrator causes the first attention score to decay based on a decay factor when the user 112 is determined to be oriented away from the first camera 106 (e.g., as determined based on the yaw angle measured by the head pose estimation circuitry 210). In particular, for each time step (e.g., 1 second, 0.1 seconds) for which the user 112 is determined to be oriented toward the first camera 106, the first integrator increases the first attention score. Similarly, for each time step for which the user 112 is determined to be oriented away from the first camera 106, the first integrator reduces the first attention score. Similarly, the second integrator increments the second attention score based on the increment factor when the user 112 is determined by the attention score generation circuitry 212 to be oriented towards the second camera 109, and the second integrator causes the second attention score to decay when the user 112 is determined to be oriented away from the second camera 109. Furthermore, the third integrator increments the third attention score based on the increment factor when the user 112 is determined to be oriented towards the third camera 111, and the third integrator causes the third attention score to decay when the user 112 is determined to be oriented away from the third camera 111.

In some examples, the increment factor is 1, and the decay factor is 0.2. In other examples, a different increment factor and/or a different decay factor may be used. In this example, the first, second, and third integrators implemented by the attention score generation circuitry 212 utilize a similar increment factor and a similar decay factor. In other examples, the increment factor and/or the decay factor can be different for at least one of the first integrator, the second integrator, or the third integrator.

The attack and decay factors applied by the attention score generation circuitry 212 can be used to reduce the occurrence of false positives with respect to the orientation of the face 118 of the user 112 relative to each of the cameras 106, 109, 111. For example, the face of the user 112 may be oriented toward the second camera 109 for a first amount of time (e.g., one minute). The user 112 briefly turn his or head toward the first camera 106 (e.g., for 2 seconds) but then turn back to the second camera 109. The application of the attack and decay factors prevents the image stream selection circuitry 214 from switching from the second video stream signal 115 to the first video stream signal 114 and again to the second video stream signal 115 when the user 112 has only turned his or her attention to the first device 104 (and, thus, the first camera 106) briefly. As a result, the image control circuitry 102 minimizes abrupt switching between video stream signals 114, 115, 116, which can be disruptive and/or disorienting to the other participants in the video conference.

The attention score generation circuitry 212 transmits the attentions scores for each of the cameras 106, 109, 111 to the image stream selection circuitry 214. The example image stream selection circuitry 214 selects the one of the video stream signals 114, 115, 116 as the video stream output, i.e., the video stream that is to be output for transmission during the video conference for presentation to the other participants in the video conference via the electronic user devices associated with the other participants. The image stream selection circuitry 214 generates instructions to cause the selected video stream to be transmitted for presentation during the video conference. In this example, the image stream selection circuitry 214 selects the one of the video stream signals 114, 115, 116 based on the attention scores and/or the yaw angles 132, 134, 136. For example, the image stream selection circuitry 214 compares each of the first, second, and third attention scores to an attention detection threshold, and identifies one of the video stream signals 114, 115, 116 corresponding to one of the first, second, and third attention scores that satisfies the attention detection threshold. In such examples, the image stream selection circuitry 214 selects the identified one of the video stream signals 114, 115, 116 for output and transmission (e.g., via the cloud 117).

In some examples, when the attention scores corresponding to two or more of the video stream signals 114, 115, 116 satisfy the attention detection threshold, the image stream selection circuitry 214 selects one of the two or more video stream signals 114, 115, 116 having a greater attention score (e.g., compared to remaining ones of the two or more video stream signals 114, 115, 116). Alternatively, when the attention scores corresponding to two or more of the video stream signals 114, 115, 116 satisfy the attention detection threshold, the image stream selection circuitry 214 can select one of the two or more video streams signals 114, 115, 116 including the video frames 220, 222, 224 in which the orientation of the facial feature is associated with the smallest yaw angle as measured by the head pose estimation circuitry 210. In some examples, in response to determining that the first, second, and third attention scores do not satisfy the attention detection threshold, the image stream selection circuitry 214 selects a default video stream for output. In some examples, the default video stream corresponds to one of the video stream signals 114, 115, 116 selected by the user 112 via user input and/or preprogrammed in the image control circuitry 102 (e.g., a user preference setting stored in the database 216).

In some examples, the user 112 can override the automatic selection of the video stream signal 114, 115, 116 by the image stream selection circuitry 214 by manually selecting a preferred one of the cameras 106, 109, 111. For example, the input interface circuitry 202 can receive and/or otherwise obtain a user selection or input from one of the devices 104, 108, 110 that indicates that a particular video stream signal 114, 115, 116 should selected. In such examples, the image stream selection circuitry 214 switches from causing the video stream signal 114, 115, 116 to be output as the video stream output based on the attention score and/or yaw angle analysis to the causing the user-selected video stream signal 114, 115, 116 to be output to be output.

In some examples, the example system 100 of FIG. 1 includes means for controlling images. For example, the means for controlling images (also referred to herein as image controlling means) may be implemented by the image control circuitry 102. In some examples, the image control circuitry 102 may be implemented by machine executable instructions such as that implemented by the machine readable instructions 600, 700 executed by processor circuitry, which may be implemented by the example processor circuitry 912 of FIG. 9, the example processor circuitry 1100 of FIG. 11, and/or the example Field Programmable Gate Array (FPGA) circuitry 1200 of FIG. 12. In other examples, the image control circuitry 102 is implemented by other hardware logic circuitry, hardware implemented state machines, and/or any other combination of hardware, software, and/or firmware. For example, the image control circuitry 102 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the image controlling means includes means for obtaining. For example, the means for obtaining may be implemented by the input interface circuitry 202. In some examples, the input interface circuitry 202 may be implemented by machine executable instructions such as that implemented by at least blocks 602, 616 of FIG. 6 executed by processor circuitry, which may be implemented by the example processor circuitry 912 of FIG. 9, the example processor circuitry 1100 of FIG. 11, and/or the example Field Programmable Gate Array (FPGA) circuitry 1200 of FIG. 12. In other examples, the input interface circuitry 202 is implemented by other hardware logic circuitry, hardware implemented state machines, and/or any other combination of hardware, software, and/or firmware. For example, the input interface circuitry 202 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the image controlling means includes means for preprocessing. For example, the means for preprocessing may be implemented by the preprocessing circuitry 204. In some examples, the preprocessing circuitry 204 may be implemented by machine executable instructions such as that implemented by at least block 604 of FIG. 6 executed by processor circuitry, which may be implemented by the example processor circuitry 912 of FIG. 9, the example processor circuitry 1100 of FIG. 11, and/or the example Field Programmable Gate Array (FPGA) circuitry 1200 of FIG. 12. In other examples, the preprocessing circuitry 204 is implemented by other hardware logic circuitry, hardware implemented state machines, and/or any other combination of hardware, software, and/or firmware. For example, the preprocessing circuitry 204 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the image controlling means includes means for modifying. For example, the means for modifying may be implemented by the down sampling circuitry 206. In some examples, the down sampling circuitry 206 may be implemented by machine executable instructions such as that implemented by at least block 606 of FIG. 6 executed by processor circuitry, which may be implemented by the example processor circuitry 912 of FIG. 9, the example processor circuitry 1100 of FIG. 11, and/or the example Field Programmable Gate Array (FPGA) circuitry 1200 of FIG. 12. In other examples, the down sampling circuitry 206 is implemented by other hardware logic circuitry, hardware implemented state machines, and/or any other combination of hardware, software, and/or firmware. For example, the down sampling circuitry 206 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the image controlling means includes means for detecting. For example, the means for detecting may be implemented by the face detection circuitry 208. In some examples, the face detection circuitry 208 may be implemented by machine executable instructions such as that implemented by at least block 608 of FIG. 6 executed by processor circuitry, which may be implemented by the example processor circuitry 912 of FIG. 9, the example processor circuitry 1100 of FIG. 11, and/or the example Field Programmable Gate Array (FPGA) circuitry 1200 of FIG. 12. In other examples, the face detection circuitry 208 is implemented by other hardware logic circuitry, hardware implemented state machines, and/or any other combination of hardware, software, and/or firmware. For example, the face detection circuitry 208 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the image controlling means includes means for pose estimating. For example, the means for pose estimating may be implemented by the head pose estimation circuitry 210. In some examples, the head pose estimation circuitry 210 may be implemented by machine executable instructions such as that implemented by at least block 610 of FIG. 6 and/or block 706 of FIG. 7 executed by processor circuitry, which may be implemented by the example processor circuitry 912 of FIG. 9, the example processor circuitry 1100 of FIG. 11, and/or the example Field Programmable Gate Array (FPGA) circuitry 1200 of FIG. 12. In other examples, the head pose estimation circuitry 210 is implemented by other hardware logic circuitry, hardware implemented state machines, and/or any other combination of hardware, software, and/or firmware. For example, the head pose estimation circuitry 210 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the image controlling means includes means for score generating. For example, the means for score generating may be implemented by the attention score generation circuitry 212. In some examples, the attention score generation circuitry 212 may be implemented by machine executable instructions such as that implemented by at least block 612 of FIG. 6 and/or blocks 702, 706, 708, 710, 712, 714, 716 of FIG. 7 executed by processor circuitry, which may be implemented by the example processor circuitry 912 of FIG. 9, the example processor circuitry 1100 of FIG. 11, and/or the example Field Programmable Gate Array (FPGA) circuitry 1200 of FIG. 12. In other examples, the attention score generation circuitry 212 is implemented by other hardware logic circuitry, hardware implemented state machines, and/or any other combination of hardware, software, and/or firmware. For example, the attention score generation circuitry 212 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the image controlling means includes means for selecting. For example, the means for selecting may be implemented by the image stream selection circuitry 214. In some examples, the image stream selection circuitry 214 may be implemented by machine executable instructions such as that implemented by at least block 614 of FIG. 6 executed by processor circuitry, which may be implemented by the example processor circuitry 912 of FIG. 9, the example processor circuitry 1100 of FIG. 11, and/or the example Field Programmable Gate Array (FPGA) circuitry 1200 of FIG. 12. In other examples, the image stream selection circuitry 214 is implemented by other hardware logic circuitry, hardware implemented state machines, and/or any other combination of hardware, software, and/or firmware. For example, the image stream selection circuitry 214 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

While an example manner of implementing the image control circuitry 102 of FIG. 1 is illustrated in FIG. 2, one or more of the elements, processes, and/or devices illustrated in FIG. 2 may be combined, divided, re-arranged, omitted, eliminated, and/or implemented in any other way. Further, the example input interface circuitry 202, the example preprocessing circuitry 204, the example down sampling circuitry 206, the example face detection circuitry 208, the example head pose estimation circuitry 210, the example attention score generation circuitry 212, the example image stream selection circuitry 214, the example database 216, and/or, more generally, the example image control circuitry 102 of FIG. 2, may be implemented by hardware alone or by hardware in combination with software and/or firmware. Thus, for example, any of the example input interface circuitry 202, the example preprocessing circuitry 204, the example down sampling circuitry 206, the example face detection circuitry 208, the example head pose estimation circuitry 210, the example attention score generation circuitry 212, the example image stream selection circuitry 214, the example database 216, and/or, more generally, the example image control circuitry 102, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example image control circuitry 102 of FIG. 1 may include one or more elements, processes, and/or devices in addition to, or instead of, those illustrated in FIG. 2, and/or may include more than one of any or all of the illustrated elements, processes, and devices.

Figure 3:
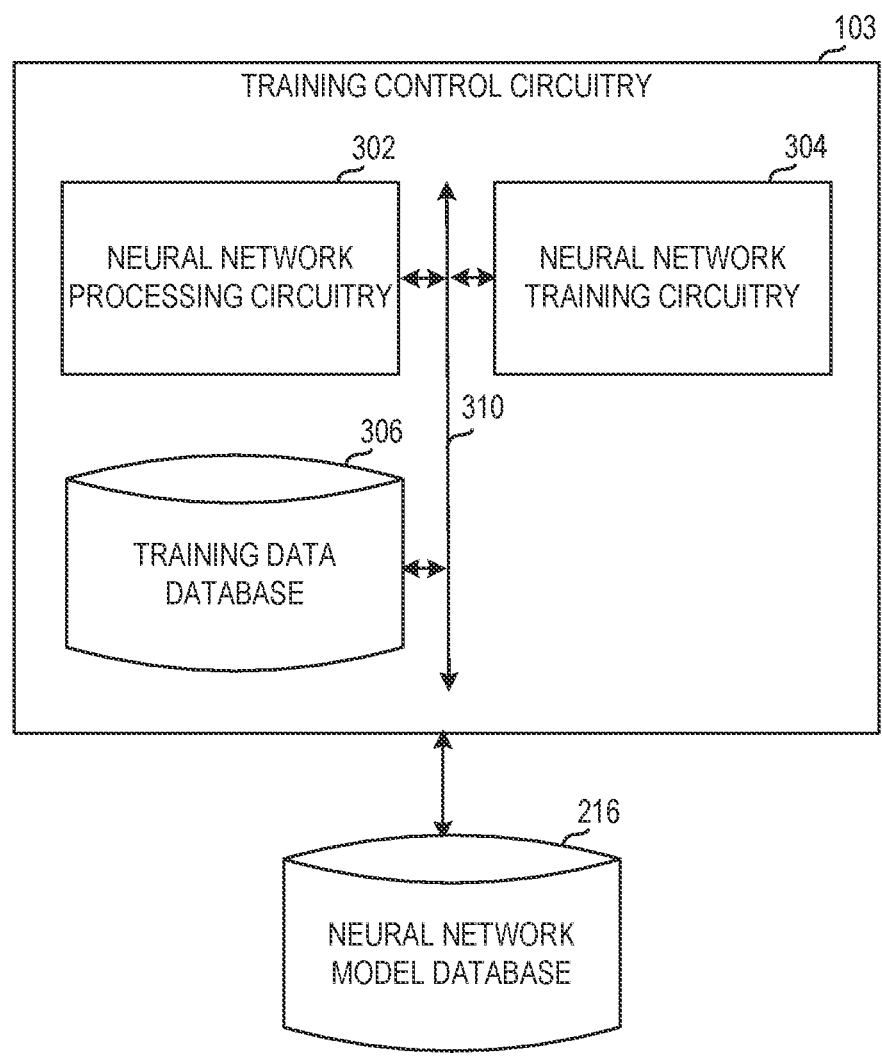
FIG. 3 is a block diagram of the example training control circuitry of FIG. 1.

FIG. 3 is a block diagram of the example training control circuitry 103 of FIG. 1. In some examples, the training control circuitry 103 generates, trains, and/or stores one or more machine learning models utilized by the image control circuitry 102 of FIGS. 1 and/or 2 with respect to detecting face(s) in the video frame image data and/or determining the yaw angle(s) of the facial feature(s) identified in the image data. In the illustrated example of FIG. 3, the training control circuitry 103 includes example neural network processing circuitry 302, example neural network training circuitry 304, and an example training data database 306. In the illustrated example of FIG. 3, any of the neural network processing circuitry 302, the neural network training circuitry 304, the training data database 306, and/or the neural network model database 308 can communicate via an example communication bus 310. Also, in the example of FIG. 3, the training control circuitry 103 is in communication with the database 216 accessible by the image control circuitry 102.

In examples disclosed herein, the communication bus 310 may be implemented using any suitable wired and/or wireless communication. In additional or alternative examples, the communication bus 310 includes software, machine readable instructions, and/or communication protocols by which information is communicated among the neural network processing circuitry 302, the neural network training circuitry 304, and/or the training data database 306.

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Many different types of machine learning models and/or machine learning architectures exist. In examples disclosed herein, a neural network model such as a VGGNet based Face Detection and Face Point detection neural network is used. In general, machine learning models/architectures that are suitable to use in the example approaches disclosed herein will be CNN based neural networks (e.g., CNN-based VGGNet neural networks). However, other types of machine learning models could additionally or alternatively be used.

In general, implementing a ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.). Alternatively, unsupervised training (e.g., used in deep learning, a subset of machine learning, etc.) involves inferring patterns from inputs to select parameters for the ML/AI model (e.g., without the benefit of expected (e.g., labeled) outputs).

In some examples disclosed herein, ML/AI models are trained using stochastic gradient descent. However, any other training algorithm may additionally or alternatively be used. In examples disclosed herein, training is performed until a targeted accuracy level is reached (e.g., >95%). Training is performed using hyperparameters that control how the learning is performed (e.g., a learning rate, a number of layers to be used in the machine learning model, etc.). In other examples, pre-trained model(s) are used. In some examples re-training may be performed. Such re-training may be performed in response to, for example, poor face detection due to, for instance, low ambient lighting.

Training is performed using training data. In examples disclosed herein, the training data originates from previously collected image data of users including user faces; previously generated bounding boxes; image data including particular facial features such as eyes, nose, etc.; image data including users with their heads and, thus, facial features, oriented in different positions, etc. Because supervised training is used, the training data is labeled. In some examples, the training data is pre-processed to provide for light balancing in the image data, image rotation, etc.

Once training is complete, the model is deployed for use as an executable construct that processes an input and provides an output based on the network of nodes and connections defined in the model. In examples disclosed herein, the model(s) are stored at one or more databases (e.g., the database 216 of FIG. 2). The model(s) may then be executed by the face detection circuitry 208 and the head pose estimation circuitry 210 of the example image control circuitry 102 of FIG. 2.

Once trained, the deployed model may be operated in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, etc.).

In some examples, output of the deployed model may be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model.

Referring to FIG. 3, the example neural network training circuitry 304 performs training of the neural network(s) implemented by the neural network processing circuitry 302. In the example of FIG. 3, first training data can be stored in the training data database 308 and can include previously generated image data including human faces with labels identifying facial features such as a nose, mouth, chin, eyes, etc. The previously generated image data can be collected by the camera(s) 106, 109, 111 associated with the user device(s) 104, 108, 110 and/or different user devices. In some examples, previously generated video frame(s) 220, 222, 224 extracted from the video stream signal(s) 114, 115, 116 by the preprocessing circuitry 204 are used as the first training data.

The neural network training circuitry 304 trains the neural network implemented by the neural network processing circuitry 302 using the first training data to detect human faces in image data. One or more face detection model(s) are generated as a result of the neural network training. The face detection model(s) are stored in the database 316 that is accessible by the face detection circuitry 208. In other examples, the face detection model(s) are stored in a different database. The databases 216, 306 may be the same storage device or different storage devices.

The face detection circuitry 208 of the example image control circuitry 102 of FIG. 2 executes the face detection model(s) for each video frame 220, 222, 224. As a result of the execution of the face detection model(s), the face detection circuitry 208 outputs bounding box(es) corresponding to detected face(s) in the respective video frames and identifying facial feature(s) such as the nose, eyes, chin, etc. for each face. In some examples, the predicted bounding box(es), the video frame(s) 220, 222, 224 are used as the training data to refine the face detection model(s).

The example neural network training circuitry 304 of FIG. 3 can also performs training of the neural network(s) implemented by the neural network processing circuitry 302 to generate head pose estimation model(s) for use by the head pose estimation circuitry 210 of the example image control circuitry 102 of FIG. 2. In the example of FIG. 3, second training data can be stored in the training data database 308 and can include previously generated image data including human faces in different poses, orientations, and/or positions with labels identifying yaw angles of facial features such as a nose, mouth, chin, eyes, etc. in the respective poses. The previously generated image data can be collected by the camera(s) 106, 109, 111 associated with the user device(s) 104, 108, 110 and/or different user devices. In some examples, previously generated video frame(s) 220, 222, 224 extracted from the video stream signal(s) 114, 115, 116 by the preprocessing circuitry 204 are used as the second training data.

The neural network training circuitry 304 trains the neural network implemented by the neural network processing circuitry 302 using the second training data to determine yaw angles of facial feature(s) (e.g., a nose) in image data.

One or more head pose model(s) are generated as a result of the neural network training. The head pose estimation model(s) are stored in the database 316 that is accessible by the head pose estimation circuitry 210. In other examples, the head pose estimation model(s) are stored in a different database.

The head pose estimation circuitry 210 executes the head pose model(s) for each video frame 220, 222, 224 that is identified by the face detection circuitry 208 as including a face. As a result of the execution of the head pose estimation model(s), the head pose estimation circuitry 210 outputs yaw angle measurement(s) for the facial feature(s) identified in the video frame image data (e.g., a yaw angle of the nose). In some examples, the yaw angle measurement(s) derived from the video frame(s) 220, 222, 224 are used as the training data to refine the head pose estimation model(s).

While an example manner of implementing the training control circuitry 103 of FIG. 1 is illustrated in FIG. 3, one or more of the elements, processes, and/or devices illustrated in FIG. 3 may be combined, divided, re-arranged, omitted, eliminated, and/or implemented in any other way. Further, the example neural network processing circuitry 302, the example neural network training circuitry 304, the example training data database 306, and/or, more generally, the example training control circuitry 103 of FIG. 3, may be implemented by hardware alone or by hardware in combination with software and/or firmware. Thus, for example, any of the neural network processing circuitry 302, the example neural network training circuitry 304, the example training data database 306, and/or, more generally, the example training control circuitry 103, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example training control circuitry 103 of FIG. 1 may include one or more elements, processes, and/or devices in addition to, or instead of, those illustrated in FIG. 2, and/or may include more than one of any or all of the illustrated elements, processes, and devices.

Figure 4:
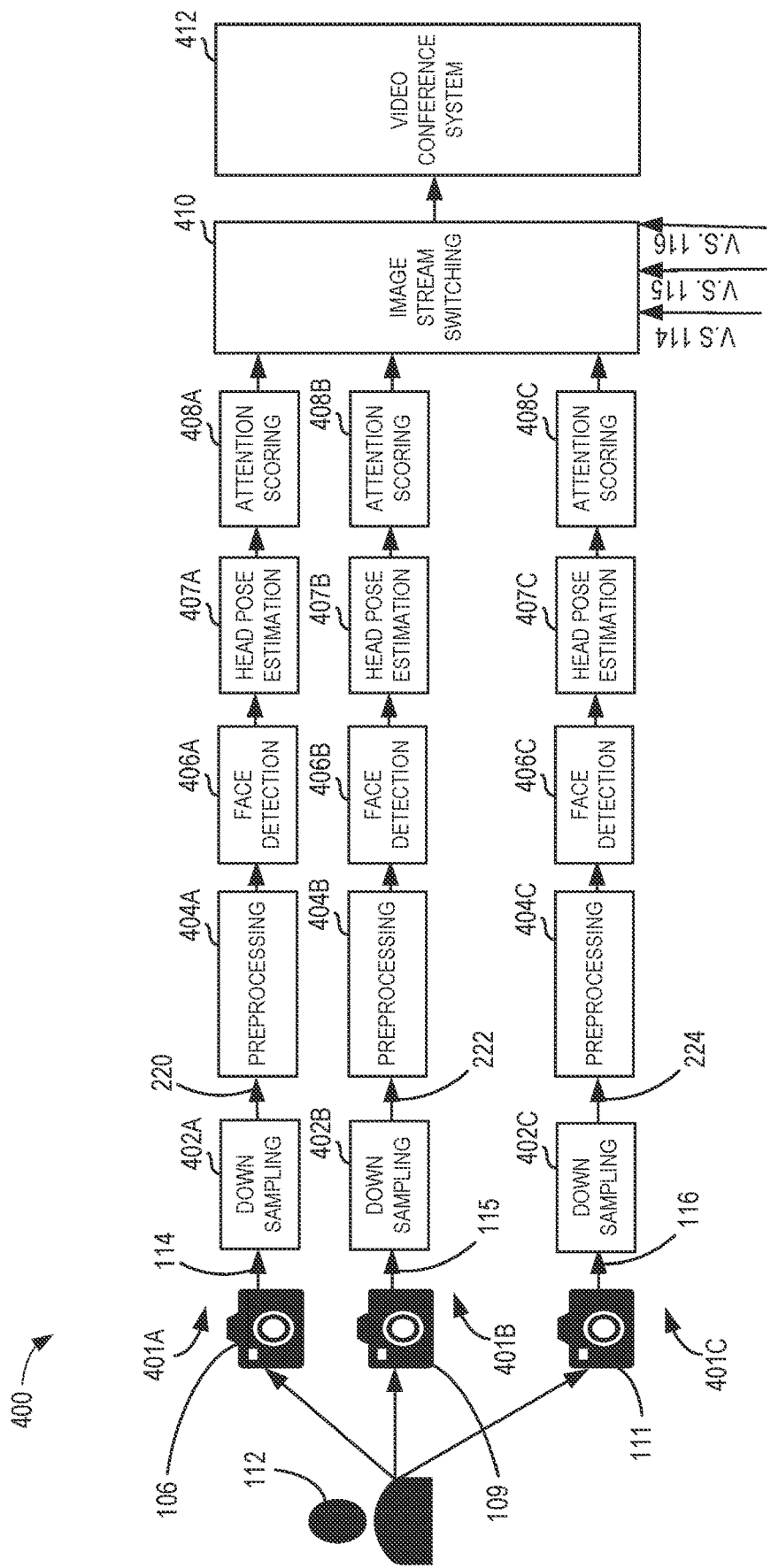
FIG. 4 is an example process flow diagram illustrating example process flows that may be implemented by the example image control circuitry of FIG. 2.

FIG. 4 is an example process flow diagram 400 illustrating an example process flow that may be implemented by the image control circuitry 102 of FIGS. 1 and/or 2 to select a video stream to be output during, for example, a video conference. In the illustrated example of FIG. 4, video of the user 112 is captured by the first camera 106, the second camera 109, and the third camera 111, where each of the cameras 106, 109, 111 is at a different location and/or orientation relative to the user 112 (e.g., as a result of the placement of the respective devices(s) 104, 108, 110 associated with the cameras 106, 109, 111). In this example, the video stream signals 114, 115, 116 are processed simultaneously or substantially simultaneously by the image control circuitry 102 along example parallel processing pipelines (e.g., parallel processing pipelines) 401A, 401B, 401C. In other examples, the video stream signals 114, 115, 116 are processed serially in a single processing pipeline.

In the illustrated example of FIG. 4, the example down sampling circuitry 206 of FIG. 2 modifies a frame rate and/or a resolution of the first, second, and third video stream signals 114, 115, 116, respectively (blocks 402A, 402B, 402C). For example, the down sampling circuitry 206 modifies the frame rate and/or the resolution to match a predefined frame rate and/or a predefined resolution for analysis using the face detection model executed by the face detection circuitry 208 and/or the head pose estimation model executed by the head pose estimation circuitry 210. As a result of the downsampling, the down sampling circuitry 206 of FIG. 2 extracts first video frame(s) 220 from the first video stream signal 114, second video frame(s) 222 from the second video stream signal 115, and third video frame(s) 224 from the third video stream signal 116.

In the example of FIG. 4, the preprocessing circuitry 204 preprocesses the video frames 220, 222, 224 from the first, second, and third video stream signals 114, 115, 116, respectively (blocks 404A, 404B, 404C). In some examples, the preprocessing circuitry 204 detects glare and/or inadequate lighting conditions in the video frames 220, 222, 224, and executes one or more image processing algorithms to reduce the glare and/or improve the lighting conditions in the video frames 220, 222, 224.

In the example of FIG. 4, the face detection circuitry 208 detects one or more faces in the video frames 220, 222, 224 from the first, second, and third video stream signals 114, 115, 116, respectively (blocks 406A, 406B, 406C). For example, the face detection circuitry 208 executes the neural-network-based face detection model(s) to identify bounding boxes (e.g., bounding regions) in the video frames 220, 222, 224, where each of the bounded regions corresponds to a detected face in the video frames 220, 222, 224. In some examples, in response to executing the face detection model, the face detection circuitry 208 also determines confidence levels associated with the bounding boxes, where each of the confidence levels indicates a confidence (e.g., a probability, a likelihood) that the corresponding bounding box contains a face.

In the example of FIG. 4, the head pose estimation circuitry 210 estimates orientations of the detected face(s) in the first, second, and third video frames 220, 222, 224, respectively (blocks 407A, 407B, 407C). For example, the head pose estimation circuitry 210 executes the neural-network-based head pose estimation model(s) to determine yaw angles of one or more facial features (e.g., the nose) in the detected face(s) of each of the video frames 220, 222, 224. In particular, the head pose estimation circuitry 210 determines the first yaw angle 132 of FIG. 1 based on a facial feature identified in the first video frame(s) 220 (block 407A), the second yaw angle 134 of FIG. 1 based on the facial feature identified in the second video frame(s) 222 (block 407B), and the third yaw angle 136 of FIG. 1 based on the facial feature identified in the third video frame(s) 224 (block 407C).

The attention score generation circuitry 212 determines attention scores for the cameras 106, 109, 111 using the first, second, and third video stream signals 114, 115, 116, respectively (blocks 408A, 408B, 408C). In the illustrated example of FIG. 4, the attention score generation circuitry 212 generates a first attention score based on a first orientation of the user 112 as represented by, for instance, the first yaw angle 132 of the identified facial feature of the user 112 in the first video frame(s) 220, a second attention score based on a second orientation of the user 112 in the second video stream signal 115 as represented by, for instance, the second yaw angle 134 of the facial feature of the user 112 in the second video frame(s) 222, and a third attention score based on a third orientation of the user 112 in the third video stream signal 116 as represented by, for instance, the third yaw angle 136 of the facial feature of the user 112 in the third video frame(s) 224.

The image stream selection circuitry 214 selects one of the first video stream signal 114, the second video stream signal 115, or the third video stream signal 116 as the video stream signal to be output for presentation during the video conference based on the attention scores and/or based on the orientations as represented by the facial feature yaw angles (block 410). For example, the image stream selection circuitry 214 selects the video stream signal 114, 115, 114 corresponding to one of the first attention score, the second attention score, or the third attention score that satisfies an attention detection threshold. In some examples, when two or more of the first, second, and third attention scores satisfy the attention detection threshold, the image stream selection circuitry 214 selects the video stream based on the yaw angles associated therewith (e.g., based on the video stream associated with image data including the facial feature at the smallest yaw angle relative to a corresponding camera 106, 109, 111). As shown in FIG. 4, the selected video stream signal 114, 115, 116 is output for transmission and presentation in the video conference via, for instance, the cloud 117 of FIG. 1 and one or more communication protocols (block 412).

Figure 5:
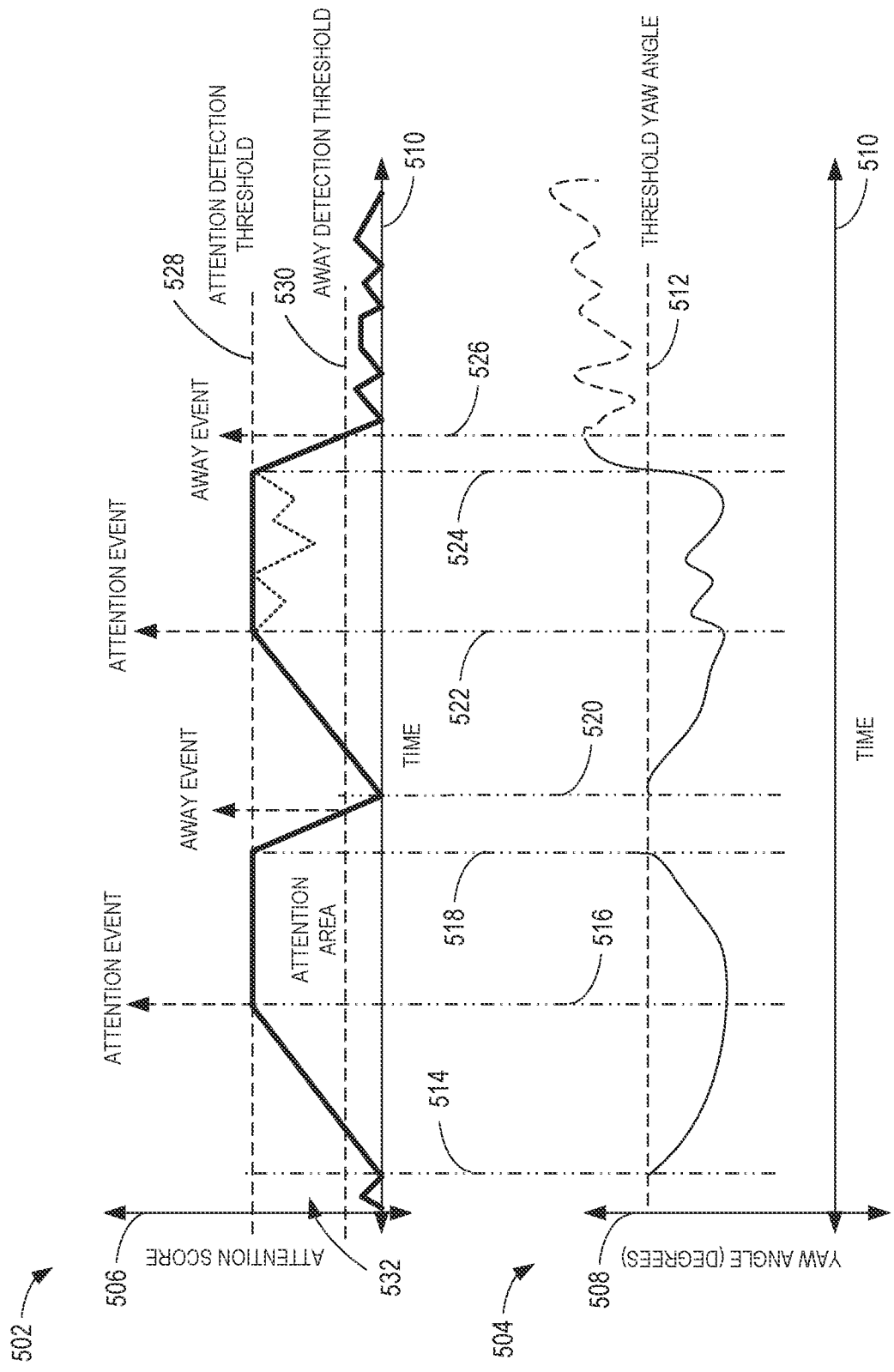
FIG. 5 includes example graphs illustrating attention score analysis performed by the image control circuitry of FIGS. 1 and/or 2 in accordance with teachings of this disclosure.

FIG. 5 includes a first example graph 502 and a second example graph 504, where the graphs 502, 504 illustrate an attention score generation analysis that can be performed by the attention score generation circuitry 212 of the example image control circuitry 102 of FIG. 2. In the illustrated example of FIG. 5, the second graph 504 illustrates yaw angle of a facial feature such as a nose of the user 112 of FIG. 1 as determined by the example head pose estimation circuitry 210 of FIG. 2 as a function of time, and the first graph 502 illustrates a corresponding attention score assigned to, for example, the first camera 106 of FIG. 1 by the example attention score generation circuitry 212 of FIG. 2 as a function of time. In the example of FIG. 5, a vertical axis 506 of the first example graph 502 represents the attention score assigned to the first camera 106 based on the analysis of corresponding to the first video stream signal 114. A horizontal axis 510 of the first graph 502 represents time (e.g., in seconds). Also, in FIG. 5, a vertical axis 508 of the second example graph 504 represents the yaw angle of a facial feature (e.g., a nose) of the user 112 identified in image data associated with the first video stream signal 114. A horizontal axis 511 of the second graph 504 represents time (e.g., in seconds). Although the first and second graphs 502, 504 in this example are associated with the first video stream signal 114, the graphs 502, 504 could alternatively be associated with the second video stream signal 115 and/or the third video stream signal 116.

The second graph 504 of FIG. 5 illustrates yaw angle measurements for a facial feature of the user 112 as detected by the head pose estimation circuitry 210 using the video frames 220 of the first video stream signal 114 as a function of time. For example, the head pose estimation circuitry 210 executes the head pose estimation model(s) using the video frames 220 of the first video stream signal 114. In the illustrated example of FIG. 5, an example threshold yaw angle 512 is represented in the second graph 504 as a first horizontal line. In this example, the threshold yaw angle 512 corresponds to a yaw angle of 30 degrees. In the example of FIG. 5, the threshold yaw angle 512 is satisfied when the yaw angle for the facial feature determined by the head pose estimation circuitry 210 is in the range of $0 \leq X \leq 30$ degrees, where X is the yaw angle. In other examples, a different threshold yaw angle (e.g., 45 degrees, 60 degrees) can be used as the threshold yaw angle 512.

As shown in the second example graph 504, the yaw angle of the facial feature of the user 112 satisfies the threshold yaw angle 512 (e.g., is less than or equal to the threshold yaw angle 512) between a first example time 514 and a second example time 516, and between the second time 516 and a third example time 518. Stated differently, the facial feature of the user 112 (and, thus, the face 118 of the user 112) is oriented toward the first camera 106 of FIG. 1 between the first time 514 and the third time 518.

In the example of FIG. 5, the head pose estimation circuitry 210 does not determine the yaw angle for the user 112 between the third time 518 and a fourth example time 520. In some examples, the face of the user 112 moves such that the face of the user 112 or at least the facial feature is no longer captured by (e.g., projected onto) a camera plane of the first camera 106 and/or is at least partially obstructed between the third and fourth times 518, 520 and, thus, the head pose estimation circuitry 210 is unable to determine the yaw angle of the facial feature between the third and fourth times 518, 520.

In the example of FIG. 5, the face of the user 112 moves such the face of the user 112 and/or at least the facial feature can be captured by (e.g., projected onto) the camera plane of the first camera 106 at the fourth time 520. In this example, the head pose estimation circuitry 210 determines that the yaw angle of facial feature as determine using the video frames 220 is between $0 \leq X \leq 30$ degrees between the fourth time 520 and a fifth example time 522 and between the fifth time 522 and a sixth time 524. Put another way, the face of the user 112 is oriented toward the first camera 106 between the fourth time 520 and the fifth time 522, and between the fifth time 522 and the sixth time 524. At the sixth time 524, the face of the user 112 moves away from the first camera 106, such that the yaw angle of the facial feature of the user 112 is greater than the threshold yaw angle 512. The estimated yaw angle for the facial feature continues to exceed the threshold yaw angle at a seventh time 526 and thereafter.

In the illustrated example of FIG. 5, the attention score generation circuitry 212 determines the attention score for the first camera 106 based on the estimated yaw angles for the facial feature determined by the head pose estimation circuitry 210 and illustrated in the second graph 504 of FIG. 5. In the first graph 502 of FIG. 5, an example attention detection threshold 528 is represented by a second horizontal line in the first graph 502 and an example away detection threshold 530 is represented by a third horizontal line in the first graph 502. The attention detection threshold 528 represents an attention score threshold indicating that the attention of the user 112 is likely directed to the first device 104 associated with the first camera 109. The away detection threshold 530 represents an attention score threshold indicating that the attention of the user 112 is likely directed away from the first device 104 associated with the first camera 109 (e.g., and directed toward another device such as, for example, the second device 108). In some examples, an example attention area 532 is defined between the attention detection threshold 528 and the away detection threshold 530.

In some examples, the attention score generation circuitry 212 determines that an attention event occurs when the attention score determined by the attention score generation circuitry 212 based on, for instance, the yaw angles, reaches the attention detection threshold 528. In such examples, when the attention score satisfies the attention detection threshold 528, the image stream selection circuitry 214 of FIG. 2 identifies the first video stream signal 114 associated with the first camera 106 as a candidate for selection as a video stream output. In some examples, after the attention event occurs, the first video stream signal 114 associated with the first camera 106 remains a candidate for selection as the video stream output for the duration in which the attention score is within the attention area 532.

In the example of FIG. 5, the attention score generation circuitry 212 determines that an away event occurs when the attention score falls below the away detection threshold 530. In some examples, in response to determining that an away event has occurred, the image stream selection circuitry 214 determines that the first video stream signal 114 associated with the first camera 106 is no longer a candidate for selection as the video stream output. In such instances, the image stream selection circuitry 214 determines that the user 112 is facing at least partially away from the first camera 106 such that a substantially forward-facing view of the face of the user is not captured by the first camera 106, as represented by the attention score falling below the away detection threshold 530. In such examples, the video stream selection circuitry 214 selects one of the second video stream signal 115 of the second camera 109 or the third video stream signal 116 of third camera 111 as the video stream output. The first video stream signal 114 associated with the first camera 106 can become a candidate for selection when another attention event occurs (e.g., when the attention score once again reaches the attention detection threshold 528).

In the illustrated example of FIG. 5, the attention score is assigned a value of zero at the first time 514. In this example, the attention score generation circuitry 212 implements an integrator to determine the attention score as a function of time based on the yaw angles of the facial feature in the second graph 504. For example, the integrator increases the attention score based on an increment factor (e.g., 1) when the yaw angle satisfies the threshold yaw angle 512 of the second graph 504 of FIG. 5, and the integrator reduces the attention score based on a decay factor (e.g., 0.2) when the yaw angle is greater than the threshold yaw angle 512. In some examples, a threshold attention duration corresponds to a duration for which the facial feature of the user 112 and, thus, the face of the user 112 is oriented toward the first camera 106 from a first attention score of zero to a second attention score equal to the attention detection threshold 528. In some examples, the threshold attention duration is 2 seconds, such that the yaw angle of the user 112 satisfies the threshold yaw angle for 2 seconds before the attention score reaches the attention detection threshold 528. However, in other examples, a different threshold attention duration (e.g., 1 second, 3 seconds, etc.) can be used. In some examples, the attention score generation circuitry 212 selects the increment factor based on the threshold attention duration.

In the illustrated example, in response to determining that the yaw angle satisfies the threshold yaw angle 512 between the first and second times 514, 516, the attention score generation circuitry 212 increases the attention score from the first time 514 to the second time 516. In this example, a first attention event occurs at the second time 516 at which the attention score reaches the attention detection threshold 528. In this example, a duration between the first and second times 514, 516 corresponds to the threshold attention duration.

In the illustrated example of FIG. 5, in response to the attention score reaching the attention detection threshold 528 at the second time 516, the image stream selection circuitry 214 determines that the first video stream signal 114 is a candidate for selection as the video stream output. In some such examples, the image stream selection circuitry 214 selects the first video stream signal 114 as the video stream output at the second time 516 instead of the second video stream signal 115 or the third video stream signal 116. In some examples, the attention detection threshold 528 corresponds to an upper limit for the attention score of the first video stream signal 114, such that the attention score does not exceed the attention detection threshold 528. As such, when the yaw angle is less than the threshold yaw angle 512 between the second and third times 516, 518, the attention score is at the attention detection threshold 528.

As mentioned in connection with the second graph 504 of FIG. 5, the face of the user 112 moves such that the face of the user 112 or at least the facial feature is no longer projected onto the camera plane of the first camera 106 between the third and fourth times 518, 520. As such, the head pose estimation circuitry 210 does not determine the yaw angle between the third and fourth times 518, 520. Accordingly, the attention score generation circuitry 212 causes the attention score to decay between the third and fourth times 518, 520, such that the attention score is approximately zero at the fourth time 520. In this example, a first away event occurs when the attention score drops below the away detection threshold 530 between the third and fourth times 518, 520. In such examples, in response to determining that the first away event has occurred, the image stream selection circuitry 214 determines that the first video stream signal 114 is no longer a candidate for selection as the video stream output. In some such examples, the image stream selection circuitry 214 causes the video stream output to switch from the first video stream signal 114 to one of the second video stream signal 115 or the third video stream signal 116.

At the fourth time 520, the face of the user 112 or at least the facial feature is again captured by the camera plane of the camera 106, and the head pose estimation circuitry 210 determines that the yaw angle of the facial feature is less than the threshold yaw angle 512 between the fourth time 520 and the sixth time 524. The attention score generation circuitry 212 causes the attention score to increase from the fourth time 520 to the fifth time 522, at which the attention score reaches the attention detection threshold 528 and, thus, a second attention event occurs. In some examples, the attention score is at the attention detection threshold 528 between the fifth and sixth times 522, 524. In other examples, when the yaw angle of the user 112 fluctuates between the fifth and sixth times 522, 524, the attention score also fluctuates within the attention area 532 between the fifth and sixth times 522, 524.

In the illustrated example of FIG. 5, at the sixth time 524 and thereafter, the head pose estimation circuitry 210 determines that the yaw angle of the user 112 is greater than the threshold yaw angle 512. As such, the attention score generation circuitry 212 causes the attention score to decay from the sixth time 524 to the seventh time 526, at which the attention score drops below the away detection threshold 530 and, thus, a second away event occurs. In this example, the attention score is below the away detection threshold 530 after the seventh time 526. As such, in some examples, the image stream selection circuitry 214 does not select the first video stream signal 114 as the video stream output after the second away event occurs at the seventh time 526.

The example head pose estimation circuitry 210 of FIG. 2 continues to analyze the video frames 220 of the first video stream signal 114 over time to determine the yaw angle of the facial feature. Also, the attention score generation circuitry 212 determines the corresponding attention scores over time based on the yaw angles. In some examples, the yaw angles and/or the attention scores can be stored in the database 216 for use by the image stream selection circuitry 214 to select the video stream output from the video stream signals 114, 115, 116.

Figure 6:
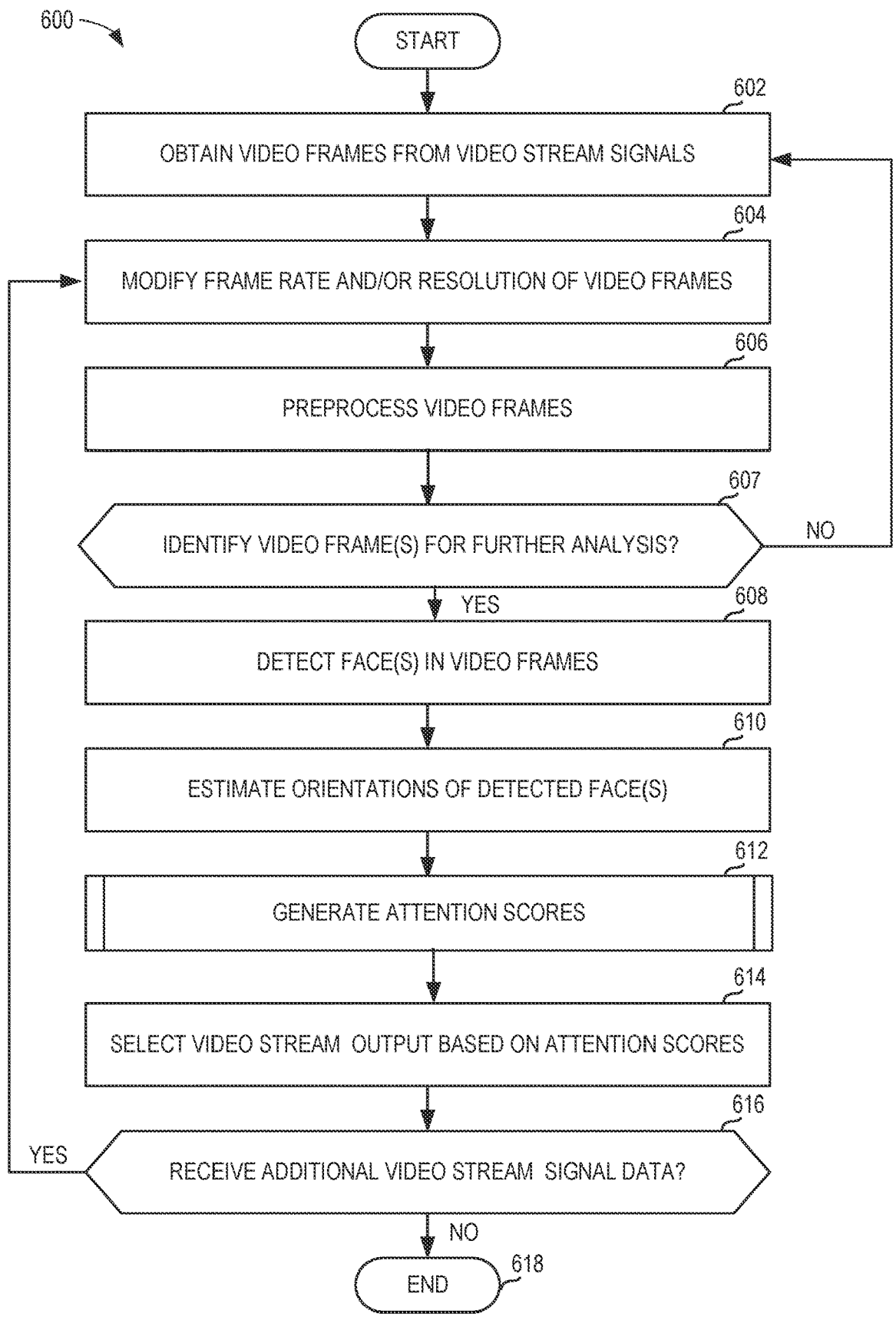
FIG. 6 is a flowchart representative of example machine readable instructions that may be executed by example processor circuitry to implement the example image control circuitry of FIG. 2 to select an image stream signal for output.
Figure 7:
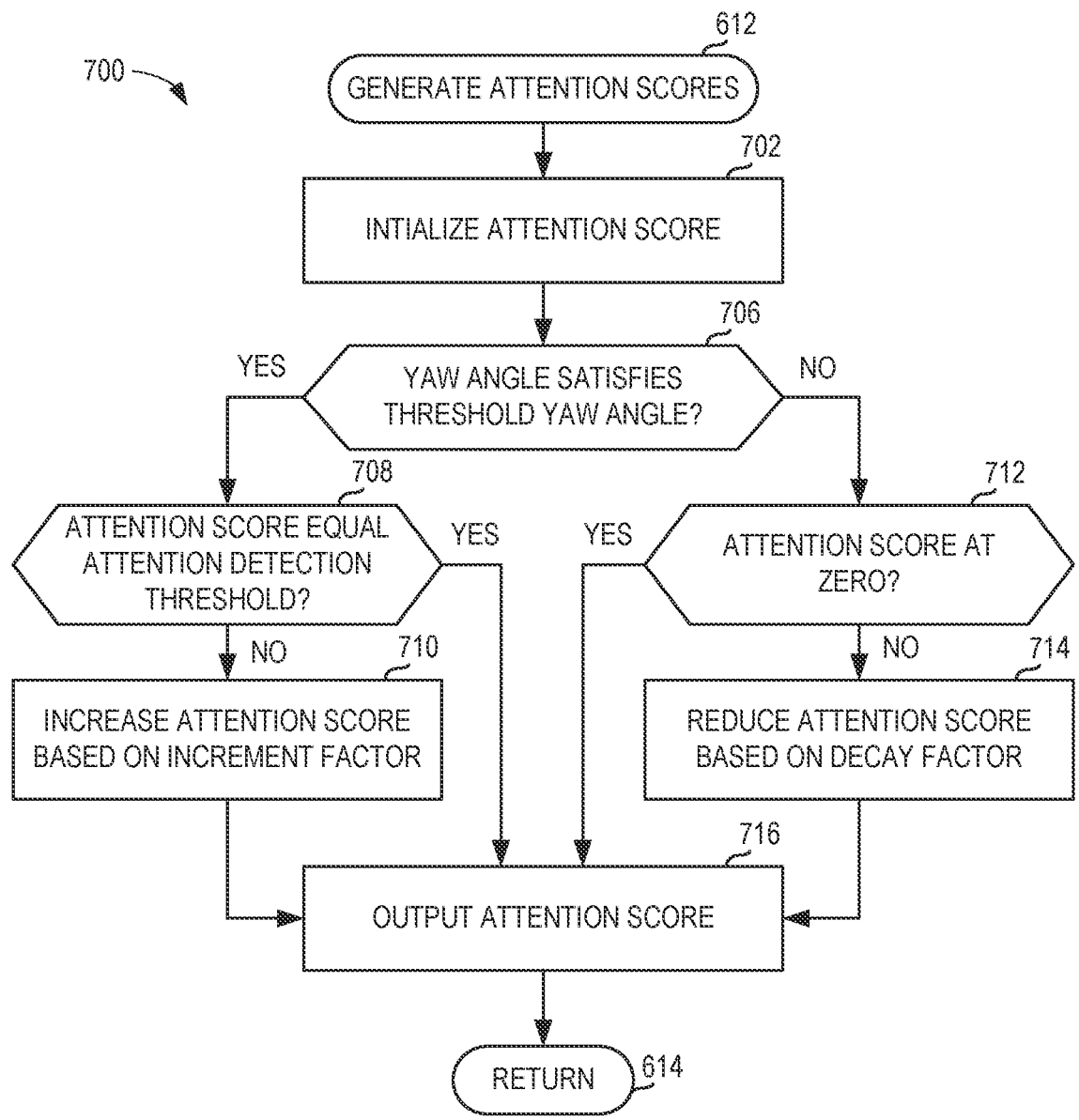
FIG. 7 is a flowchart representative of example machine readable instructions that may be executed by example processor circuitry to implement block 612 of FIG. 6 to generate attention scores.
Figure 8:
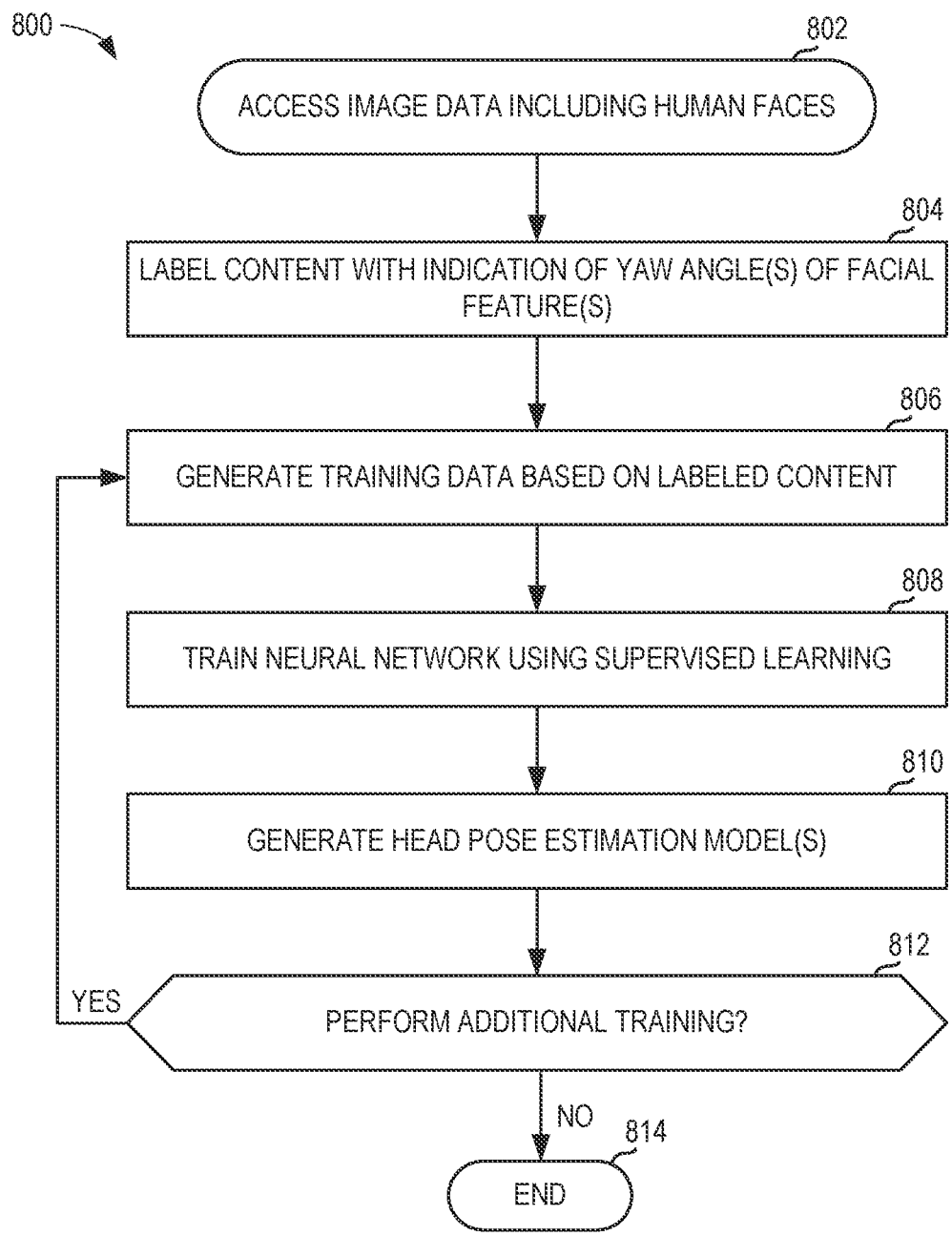
FIG. 8 is a flowchart representative of example machine readable instructions that may be executed by example processor circuitry to implement the example training control circuitry of FIG. 3.

Flowcharts representative of example hardware logic circuitry, machine readable instructions, hardware implemented state machines, and/or any combination thereof for implementing the image control circuitry 102 of FIGS. 1 and/or 2 are shown in FIGS. 6 and 7. A flowchart representative of example hardware logic circuitry, machine readable instructions, hardware implemented state machines, and/or any combination thereof for implementing the training control circuitry 103 of FIGS. 1 and/or 3 are shown in FIG. 8. The machine readable instructions may be one or more executable programs or portion(s) of an executable program for execution by processor circuitry, such as the processor circuitry 912, 1012 shown in the example processor platforms 900, 1000 discussed below in connection with FIGS. 9 and/or 10 and/or the example processor circuitry discussed below in connection with FIGS. 11 and/or 12. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 6, 7, and/or 8, many other methods of implementing the example image control circuitry 102 and/or the example training control circuitry 103 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIGS. 6 and 7 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 6 is a flowchart representative of example machine readable instructions and/or example operations 600 that may be executed and/or instantiated by processor circuitry to select image data from two or more image data streams. For illustrative purposes, the example of FIG. 6 is discussed in connection with selection of one of the first, second, or third video stream signals 114, 115, 116 of FIG. 1 as a video stream output for transmission to, for example, other electronic devices in a video conference. However, the instructions of FIG. 6 could additionally or alternatively be executed for other types of image data, such as still images. The machine readable instructions and/or operations 600 of FIG. 6 begin at block 602, at which input interface circuitry 202 of the example image control circuitry 102 of FIG. 2 obtains the video stream signals 114, 115, 116. For example, the example input interface circuitry 202 of FIG. 2 obtains the first video stream signal 114 from the first camera 106, the second video stream signal 115 from the second camera 109, and the third video stream signal 116 from the third camera 111.

At block 604, the example image control circuitry 102 modifies a frame rate and/or a resolution of the video frames 220, 222, 224 defining the video stream signals 114, 115, 116, respectively. For example, the down sampling circuitry 206 modifies the frame rate and/or resolution of the video frames 220, 222, 224 to match a predefined frame rate and/or resolution.

At block 606, the example image control circuitry 102 processes the video frames 220, 222, 224 from the first, second, and third video stream signals 114, 115, 116. For example, the example preprocessing circuitry 204 of FIG. 2 identifies glare and/or inadequate lighting conditions in the video frames 220, 222, 224, and applies image processing techniques to reduce the glare and/or improve the lighting conditions in the video frames 220, 222, 224. In the example of FIG. 6, if the preprocessing circuitry 204 of FIG. 2 determines that the lighting is not adequate for image analysis (block 607), control returns to block 602 to access additional video frame(s) for analysis.

At block 608, the example image control circuitry 102 detects the face 118 of the user 112 of FIG. 1 in the video frames 220, 222, 224. For example, the example face detection circuitry 208 executes face detection model(s) (e.g., trained by the training control circuitry 103 of FIG. 1) using the video frames 220, 222, 224, and detects the face 118 of the user 112 and facial features of the face 118 (e.g., a nose, an eye) in each of the video frames 220, 222, 224 as a result of execution of the face detection model. In some examples, outputs of the face detection model include bounding boxes corresponding to detected faces in the video frames 220, 222, 224 with facial features labeled.

At block 610, the example image control circuitry 102 estimations orientations (e.g., yaw angles) of the detected faces in the video frames 220, 222, 224 using the identified facial features. For example, the example head pose estimation circuitry 210 executes head pose estimation model(s) (e.g., trained by the training control circuitry 103 of FIG. 1) to estimate the yaw angle(s) of the facial feature(s) identified in each of the video frames 220, 222, 224. The outputs of the executed head pose estimation model(s) include yaw angles of the facial feature(s) in the detected faces. In some examples, the head pose estimation circuitry 210 determines first yaw angles as a function of time for the first video stream signal 114 (e.g., as shown in the second graph 504 of FIG. 5), second yaw angles as a function of time for the second video stream signal 115, and third yaw angles as a function of time for the third video stream signal 116.

At block 612, the example image control circuitry 102 generates attention scores for the first, second, and third cameras 106, 109, 111 based on the analysis of the first, second, and third video stream signals 114, 115, 116. For example, the example attention score generation circuitry 212 of FIG. 2 generates first attention scores as a function of time (e.g., as shown in the first graph 502 of FIG. 5) for the first video stream signal 114 based on the first yaw angles of the facial feature detecting in the first video frames 220, second attention scores as a function of time for the second video stream signal 115 based on the second yaw angles of the facial feature detecting in the second video frames 222, and third attention scores as a function of time for the third video stream signal 116 based on the third yaw angles of the facial feature detecting in the third video frames 224. Generation of the first, second, and third attention scores is disclosed further in detail below in connection with FIG. 7.

At block 614, the example image control circuitry 102 selects one of the first, second, and third video stream signals 114, 115, 116 as the video stream output based on the first, second, and third attention scores. For example, the example image stream selection circuitry 214 of FIG. 2 selects the video stream signal 114, 115, 116 from the camera 106, 109, 111 assigned an attention score that satisfies the attention detection threshold. In some examples, in response to two or more of the attention scores satisfying the attention detection threshold, the image stream selection circuitry 214 selects the video stream signal 114, 115, 116 for which the facial feature identified in the corresponding image data is associated with the lesser yaw angle. The image stream selection circuitry 214 causes the selected video stream signal output to be transmitted for display or presentation during the video conference (e.g., transmission via the cloud 117). The example instructions 600 of FIG. 6 end at blocks 616, 618 when no additional video stream signal data is received.

FIG. 7 is a flowchart representative of example machine readable instructions and/or example operations 700 that may be executed and/or instantiated by processor circuitry to generate attention scores in connection with block 612 of FIG. 6. In the illustrated example of FIG. 7, the machine readable instructions and/or operations 700 are executed by the example image control circuitry 102 of FIG. 2 (e.g., the attention score generation circuitry 212 of FIG. 2) to generate attention scores for the cameras 106, 109, 111 based on analysis of the image data in corresponding video stream signals 114, 115, 116 of FIG. 2. For illustrative purposes, the example instructions 700 of FIG. 7 will be discussed in connection with the first video stream signal 114 of the first camera 106 with the understanding that the instructions 700 could be executed to determine attention scores based on the second video stream signal 115 generated by the second camera 109 and/or the third video stream signal 116 generated by the third camera 111.

The machine readable instructions and/or operations 700 of FIG. 7 begin at block 702, at which the example image control circuitry 102 of FIG. 2 initializes the attention score (e.g., the first attention score) of the first video stream signal 114. For example, the example attention score generation circuitry 212 of FIG. 2 sets the attention score to zero at a starting time (e.g., the first time 514 of FIG. 5). In some examples, the attention score generation circuitry 212 of FIG. 2 can assign the attention score at a different initial value.

At block 706, the example image control circuitry 102 determines whether a yaw angle of a facial feature in a detected face in the video frame 220 satisfies a threshold yaw angle. For example, in response to execution of the head pose estimation model(s), the example head pose estimation circuitry 210 determines the yaw angle of the facial feature of the detected face in the video frame 220 and determines whether the yaw angle satisfies the threshold yaw angle. In response to the head pose estimation circuitry 210 determining that the yaw angle satisfies the threshold yaw angle (e.g., block 706 returns a result of YES), control proceeds to block 708. Alternatively, in response to the head pose estimation circuitry 210 determining that the yaw angle does not satisfy the threshold yaw angle (e.g., block 706 returns a result of NO), control proceeds to block 712.

At block 708, the example image control circuitry 102 determines whether the attention score value equals an attention detection threshold. In response to the attention score generation circuitry 212 determining that the attention score is at the attention detection threshold (e.g., block 708 returns a result of YES), control proceeds to block 716. Alternatively, in response to the attention score generation circuitry 212 determining that the attention score is less than the attention detection threshold (e.g., block 708 returns a result of NO), control proceeds to block 710.

At block 710, the example image control circuitry 102 increases the attention score based on an increment factor. For example, the example attention score generation circuitry 212 implements an integrator to increase the attention score based on the increment factor, where the increment factor can be 1, for example.

At block 712, the example image control circuitry 102 determines whether the attention score is at zero. In response to the attention score generation circuitry 212 determining that the attention score is at zero (e.g., block 712 returns a result of YES), control proceeds to block 716. Alternatively, in response to the attention score generation circuitry 212 determining that the attention score is more than zero (e.g., block 712 returns a result of NO), control proceeds to block 714.

At block 714, the example image control circuitry 102 reduces the attention score based on a decay factor. For example, the example attention score generation circuitry 212 implements the integrator to cause the attention score to decay based on the decay factor, where the decay factor can be 0.2, for example.

At block 716, the example image control circuitry 102 outputs the attention score for the video frame 220 of for the first video stream signal 114. In the example of FIG. 7, control proceeds to block 614 of FIG. 6, where the image stream selection circuitry 214 uses the attention score to select one of the video stream signals 114, 115, 116 as the video stream output (block 64 of FIG. 6).

FIG. 8 is a flowchart representative of example machine readable instructions and/or example operations 800 that may be executed and/or instantiated by processor circuitry to train a neural network to determine yaw angles of facial features of human faces in image data. The example instructions 800 of FIG. 8, when executed by the training control circuitry 103 of FIG. 3, result in a neural network and/or a model thereof (e.g., the head pose estimation model(s)), that can be distributed to other computing systems, such as the head pose estimation circuitry 210 of the example image control circuitry 102 of FIG. 2.

The machine readable instructions and/or operations 800 of FIG. 8 begin at block 802, at which the neural network training circuitry 304 accesses image data including human faces. The image data can include the video frame(s) 220, 222, 224 and/or the predicted bounding box(es) stored in the database 216 associated with the image control circuitry 102 as part of feedback training.

At block 804, the neural network training circuitry 304 labels the data with respect to yaw angles of facial features (e.g., a nose, an eye, a chin) human faces in the image data. In some examples, relative distances between two or more facial features (e.g., the nose and the chin) are labelled and correlated with the yaw angles. At block 806, the example neural network training circuitry 30 generates the training data based on the labeled image data.

At block 808, the example neural network training circuitry 304 performs training of the neural network processing circuitry 302 using the training data. In the example of FIG. 8, the training is based on supervised learning. As a result of the training, the head pose estimation model(s) are generated at block 810. Based on the head pose estimation model(s), the neural network is trained to identify the yaw angle of the facial feature(s) of human faces in image data. In some examples, the neural network is trained to predict yaw angles based on distances between facial features in the image data. The head pose estimation model(s) can be stored in the database 216 for access by the head pose estimation circuitry 210 of the example image control circuitry 102 of FIG. 3. The example instructions 800 of FIG. 8 end when no additional training (e.g., retraining) is to be performed (blocks 812, 814).

Figure 9:
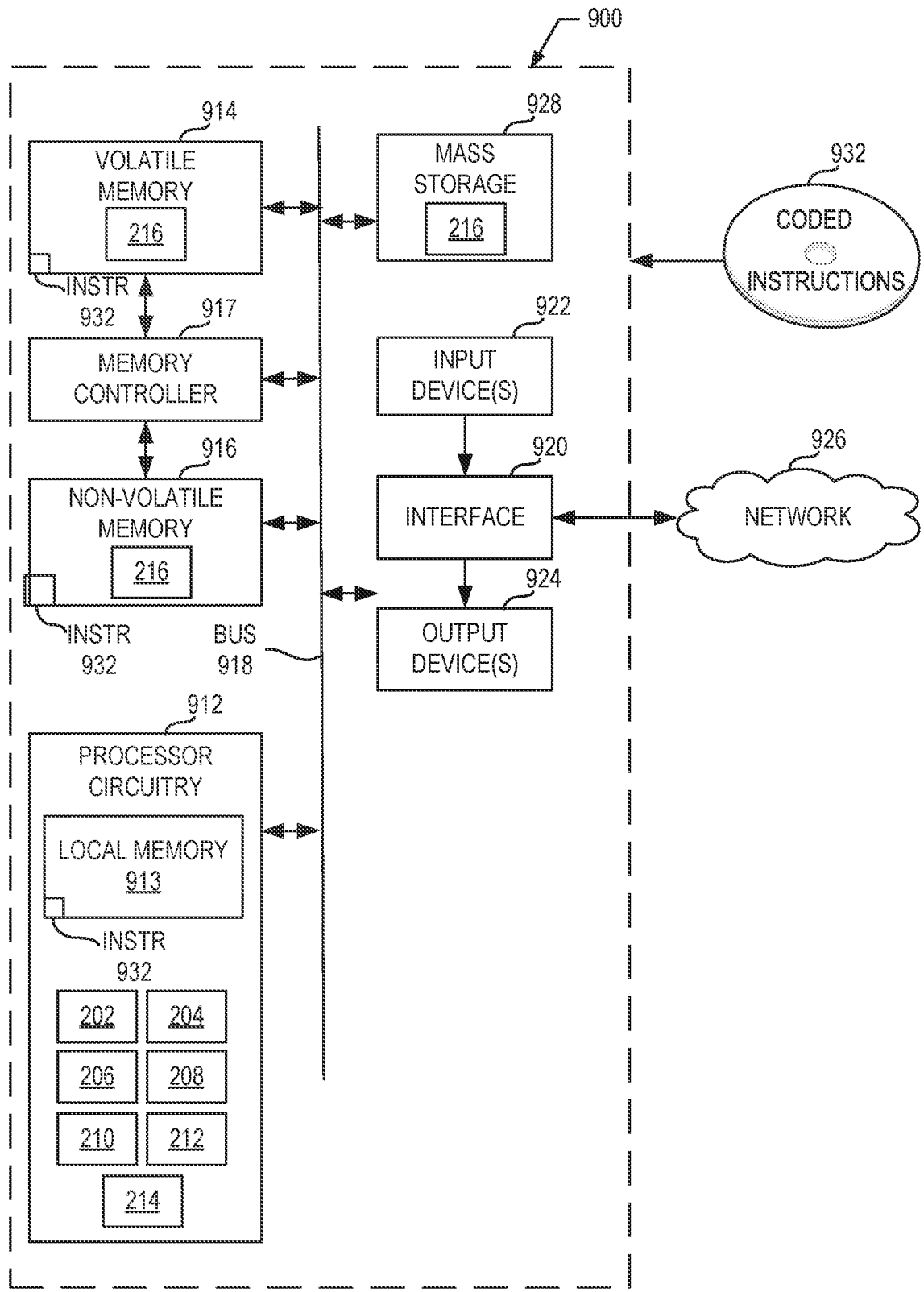
FIG. 9 is a block diagram of an example processing platform including processor circuitry structured to execute the example machine readable instructions of FIGS. 6 and/or 7 to implement the example image control circuitry of FIGS. 1 and/or 2.

FIG. 9 is a block diagram of an example processor platform 900 structured to execute and/or instantiate the machine readable instructions and/or operations of FIGS. 6 and 7 to implement the image control circuitry 102 of FIG. 2. The processor platform 900 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a headset (e.g., an augmented reality (AR) headset, a virtual reality (VR) headset, etc.) or other wearable device, or any other type of computing device.

The processor platform 900 of the illustrated example includes processor circuitry 912. The processor circuitry 912 of the illustrated example is hardware. For example, the processor circuitry 912 can be implemented by one or more integrated circuits, logic circuits, FPGAs microprocessors, CPUs, GPUs, DSPs, and/or microcontrollers from any desired family or manufacturer. The processor circuitry 912 may be implemented by one or more semiconductor based (e.g., silicon based) devices. In this example, the processor circuitry 912 implements the example input interface circuitry 202, the example preprocessing circuitry 204, the example down sampling circuitry 206, the example face detection circuitry 208, the example head pose estimation circuitry 210, the example attention score generation circuitry 212, and the example image stream selection circuitry 214.

The processor circuitry 912 of the illustrated example includes a local memory 913 (e.g., a cache, registers, etc.). The processor circuitry 912 of the illustrated example is in communication with a main memory including a volatile memory 914 and a non-volatile memory 916 by a bus 918. The volatile memory 914 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 916 may be implemented by flash memory and/or any other desired type of memory device. Access to the main memory 914, 916 of the illustrated example is controlled by a memory controller 917.

The processor platform 900 of the illustrated example also includes interface circuitry 920. The interface circuitry 920 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 922 are connected to the interface circuitry 920. The input device(s) 922 permit(s) a user to enter data and/or commands into the processor circuitry 912. The input device(s) 922 can be implemented by, for example, an audio sensor, a microphone, a camera (still or video), a keyboard, a button, a mouse, a touchscreen, a track-pad, a trackball, an isopoint device, and/or a voice recognition system.

One or more output devices 924 are also connected to the interface circuitry 920 of the illustrated example. The output devices 924 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 920 of the illustrated example, thus, typically includes a graphics driver card, a graphics driver chip, and/or graphics processor circuitry such as a GPU.

The interface circuitry 920 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 926. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 900 of the illustrated example also includes one or more mass storage devices 928 to store software and/or data. Examples of such mass storage devices 928 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 932, which may be implemented by the machine readable instructions of FIGS. 6 and/or 7, may be stored in the mass storage device 928, in the volatile memory 914, in the non-volatile memory 916, and/or on a removable non-transitory computer readable storage medium such as a CD or DVD.

Figure 10:
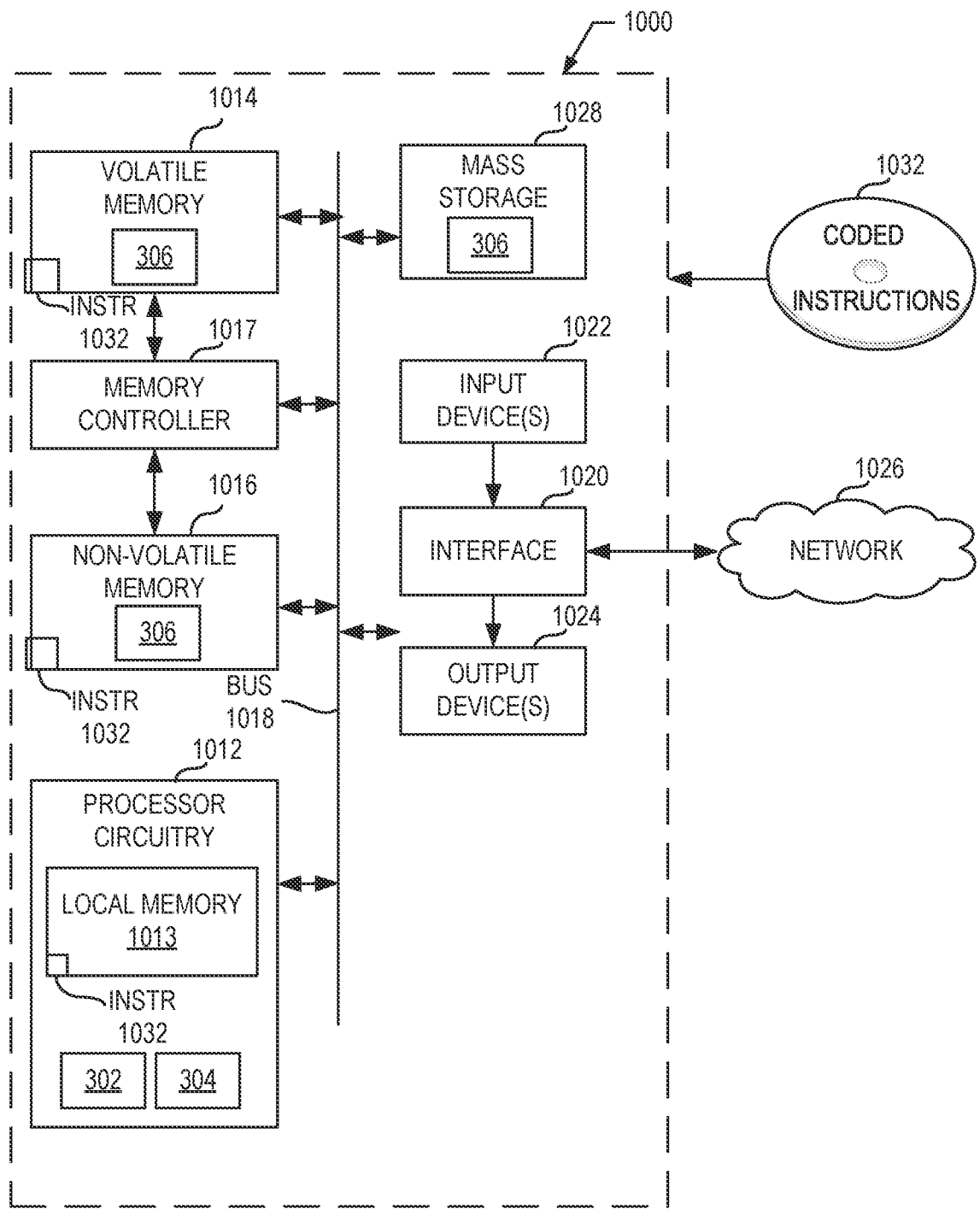
FIG. 10 is a block diagram of an example processing platform including processor circuitry structured to execute the example machine readable instructions of FIG. 11 to implement the example training control circuitry of FIG. 3.

FIG. 10 is a block diagram of an example processor platform 1000 structured to execute and/or instantiate the machine readable instructions and/or operations of FIG. 8 to implement the training control circuitry 103 of FIGS. 1 and/or 3. The processor platform 1000 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a headset (e.g., an augmented reality (AR) headset, a virtual reality (VR) headset, etc.) or other wearable device, or any other type of computing device.

The processor platform 1000 of the illustrated example includes processor circuitry 1012. The processor circuitry 1012 of the illustrated example is hardware. For example, the processor circuitry 1012 can be implemented by one or more integrated circuits, logic circuits, FPGAs microprocessors, CPUs, GPUs, DSPs, and/or microcontrollers from any desired family or manufacturer. The processor circuitry 1012 may be implemented by one or more semiconductor based (e.g., silicon based) devices. In this example, the processor circuitry 1012 implements the example neural network processing circuitry 302 and the example neural network training circuitry 304.

The processor circuitry 1012 of the illustrated example includes a local memory 1013 (e.g., a cache, registers, etc.). The processor circuitry 1012 of the illustrated example is in communication with a main memory including a volatile memory 1014 and a non-volatile memory 1016 by a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1016 may be implemented by flash memory and/or any other desired type of memory device. Access to the main memory 1014, 1016 of the illustrated example is controlled by a memory controller 1017.

The processor platform 1000 of the illustrated example also includes interface circuitry 1020. The interface circuitry 1020 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1022 are connected to the interface circuitry 1020. The input device(s) 1022 permit(s) a user to enter data and/or commands into the processor circuitry 1012. The input device(s) 1022 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1024 are also connected to the interface circuitry 1020 of the illustrated example. The output devices 1024 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1020 of the illustrated example, thus, typically includes a graphics driver card, a graphics driver chip, and/or graphics processor circuitry such as a GPU.

The interface circuitry 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1026. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1000 of the illustrated example also includes one or more mass storage devices 1028 to store software and/or data. Examples of such mass storage devices 1028 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1032, which may be implemented by the machine readable instructions of FIG. 8, may be stored in the mass storage device 1028, in the volatile memory 1014, in the non-volatile memory 1016, and/or on a removable non-transitory computer readable storage medium such as a CD or DVD.

Figure 11:
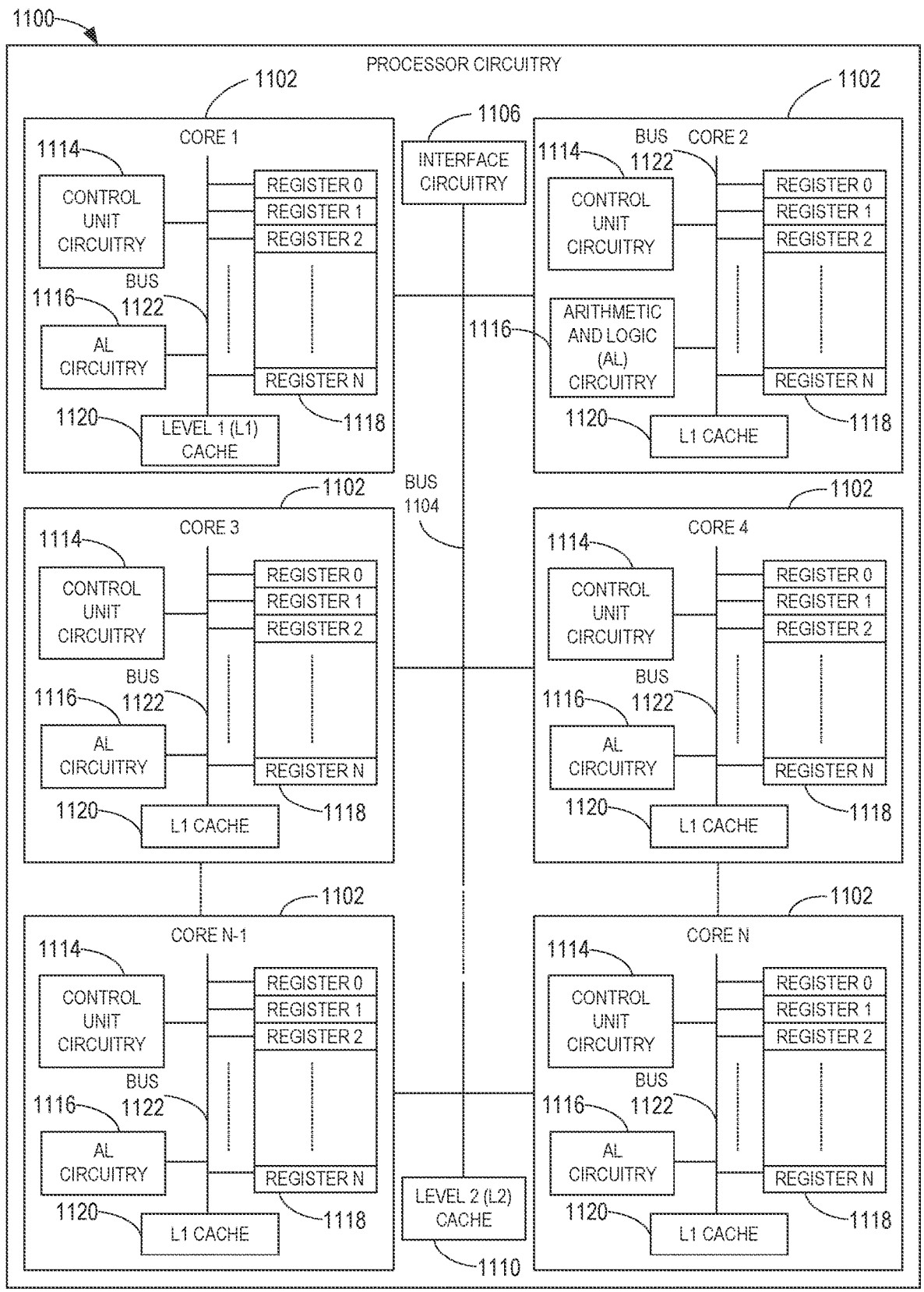
FIG. 11 is a block diagram of an example implementation of the processor circuitry of FIGS. 9 and/or 10.

FIG. 11 is a block diagram of an example implementation of the processor circuitry 912 of FIG. 9 and/or the processor circuitry 1012 of FIG. 10. In this example, the processor circuitry 912 of FIG. 9 and/or the processor circuitry 1012 of FIG. 10 is implemented by a microprocessor 1100. For example, the microprocessor 1100 may implement multi-core hardware circuitry such as a CPU, a DSP, a GPU, an XPU, etc. Although it may include any number of example cores 1102 (e.g., 1 core), the microprocessor 1100 of this example is a multi-core semiconductor device including N cores. The cores 1102 of the microprocessor 1100 may operate independently or may cooperate to execute machine readable instructions. For example, machine code corresponding to a firmware program, an embedded software program, or a software program may be executed by one of the cores 1102 or may be executed by multiple ones of the cores 1102 at the same or different times. In some examples, the machine code corresponding to the firmware program, the embedded software program, or the software program is split into threads and executed in parallel by two or more of the cores 1102. The software program may correspond to a portion or all of the machine readable instructions and/or operations represented by the flowcharts of FIGS. 6, 7, and/or 8.

The cores 1102 may communicate by an example bus 1104. In some examples, the bus 1104 may implement a communication bus to effectuate communication associated with one(s) of the cores 1102. For example, the bus 1104 may implement at least one of an Inter-Integrated Circuit (I2C) bus, a Serial Peripheral Interface (SPI) bus, a PCI bus, or a PCIe bus. Additionally or alternatively, the bus 1104 may implement any other type of computing or electrical bus. The cores 1102 may obtain data, instructions, and/or signals from one or more external devices by example interface circuitry 1106. The cores 1102 may output data, instructions, and/or signals to the one or more external devices by the interface circuitry 1106. Although the cores 1102 of this example include example local memory 1120 (e.g., Level 1 (L1) cache that may be split into an L1 data cache and an L1 instruction cache), the microprocessor 1100 also includes example shared memory 1110 that may be shared by the cores (e.g., Level 2 (L2_cache)) for high-speed access to data and/or instructions. Data and/or instructions may be transferred (e.g., shared) by writing to and/or reading from the shared memory 1110. The local memory 1120 of each of the cores 1102 and the shared memory 1110 may be part of a hierarchy of storage devices including multiple levels of cache memory and the main memory (e.g., the main memory 914, 916 of FIG. 9 and/or the main memory 1014, 1016 of FIG. 10). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1102 may be referred to as a CPU, DSP, GPU, etc., or any other type of hardware circuitry. Each core 1102 includes control unit circuitry 1114, arithmetic and logic (AL) circuitry (sometimes referred to as an ALU) 1116, a plurality of registers 1118, the L1 cache 1120, and an example bus 1122. Other structures may be present. For example, each core 1102 may include vector unit circuitry, single instruction multiple data (SIMD) unit circuitry, load/store unit (LSU) circuitry, branch/jump unit circuitry, floating-point unit (FPU) circuitry, etc. The control unit circuitry 1114 includes semiconductor-based circuits structured to control (e.g., coordinate) data movement within the corresponding core 1102. The AL circuitry 1116 includes semiconductor-based circuits structured to perform one or more mathematic and/or logic operations on the data within the corresponding core 1102. The AL circuitry 1116 of some examples performs integer based operations. In other examples, the AL circuitry 1116 also performs floating point operations. In yet other examples, the AL circuitry 1116 may include first AL circuitry that performs integer based operations and second AL circuitry that performs floating point operations. In some examples, the AL circuitry 1116 may be referred to as an Arithmetic Logic Unit (ALU). The registers 1118 are semiconductor-based structures to store data and/or instructions such as results of one or more of the operations performed by the AL circuitry 1116 of the corresponding core 1102. For example, the registers 1118 may include vector register(s), SIMD register(s), general purpose register(s), flag register(s), segment register(s), machine specific register(s), instruction pointer register(s), control register(s), debug register(s), memory management register(s), machine check register(s), etc. The registers 1118 may be arranged in a bank as shown in FIG. 11. Alternatively, the registers 1118 may be organized in any other arrangement, format, or structure including distributed throughout the core 1102 to shorten access time. The bus 1120 may implement at least one of an I2C bus, a SPI bus, a PCI bus, or a PCIe bus Each core 1102 and/or, more generally, the microprocessor 1100 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1100 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 12:
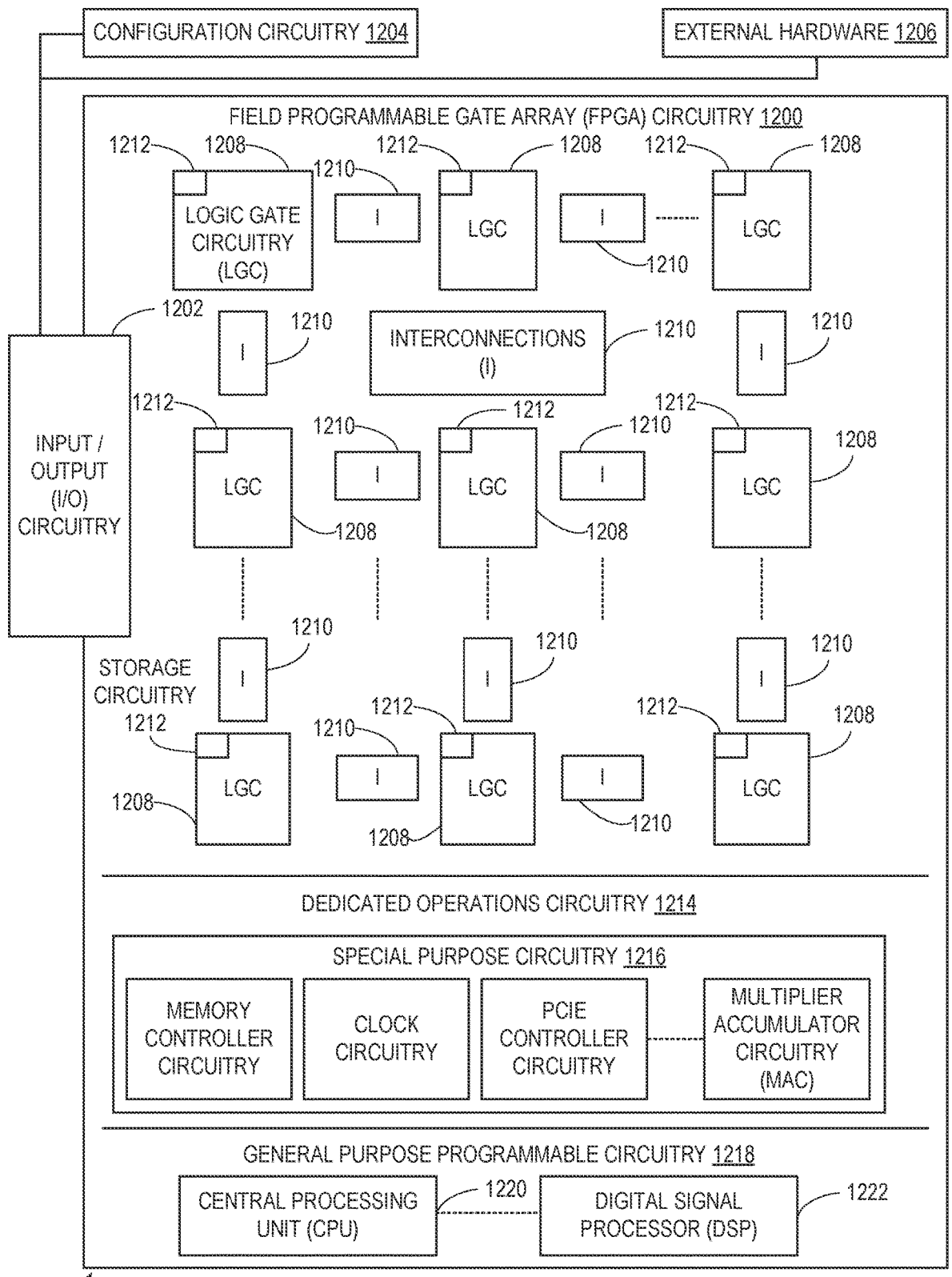
FIG. 12 is a block diagram of another example implementation of the processor circuitry of FIGS. 9 and/or 10.

FIG. 12 is a block diagram of another example implementation of the processor circuitry 912 of FIG. 9 and/or the processor circuitry 1012 of FIG. 10. In this example, the processor circuitry 912 and/or the processor circuitry 1012 is implemented by FPGA circuitry 1200. The FPGA circuitry 1200 can be used, for example, to perform operations that could otherwise be performed by the example microprocessor 1100 of FIG. 11 executing corresponding machine readable instructions. However, once configured, the FPGA circuitry 1200 instantiates the machine readable instructions in hardware and, thus, can often execute the operations faster than they could be performed by a general purpose microprocessor executing the corresponding software.

More specifically, in contrast to the microprocessor 1100 of FIG. 11 described above (which is a general purpose device that may be programmed to execute some or all of the machine readable instructions represented by the flowcharts of FIGS. 6, 7, and/or 8 but whose interconnections and logic circuitry are fixed once fabricated), the FPGA circuitry 1200 of the example of FIG. 12 includes interconnections and logic circuitry that may be configured and/or interconnected in different ways after fabrication to instantiate, for example, some or all of the machine readable instructions represented by the flowcharts of FIGS. 6, 7, and/or 8. In particular, the FPGA 1200 may be thought of as an array of logic gates, interconnections, and switches. The switches can be programmed to change how the logic gates are interconnected by the interconnections, effectively forming one or more dedicated logic circuits (unless and until the FPGA circuitry 1200 is reprogrammed). The configured logic circuits enable the logic gates to cooperate in different ways to perform different operations on data received by input circuitry. Those operations may correspond to some or all of the software represented by the flowcharts of FIGS. 6, 7, and/or 8. As such, the FPGA circuitry 1200 may be structured to effectively instantiate some or all of the machine readable instructions of the flowcharts of FIGS. 6, 7, and/or 8 as dedicated logic circuits to perform the operations corresponding to those software instructions in a dedicated manner analogous to an ASIC. Therefore, the FPGA circuitry 1200 may perform the operations corresponding to the some or all of the machine readable instructions of FIGS. 6, 7, and/or 8 faster than the general purpose microprocessor can execute the same.

In the example of FIG. 12, the FPGA circuitry 1200 is structured to be programmed (and/or reprogrammed one or more times) by an end user by a hardware description language (HDL) such as Verilog. The FPGA circuitry 1200 of FIG. 12, includes example input/output (I/O) circuitry 1202 to obtain and/or output data to/from example configuration circuitry 1204 and/or external hardware (e.g., external hardware circuitry) 1206. For example, the configuration circuitry 1204 may implement interface circuitry that may obtain machine readable instructions to configure the FPGA circuitry 1200, or portion(s) thereof. In some such examples, the configuration circuitry 1204 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1206 may implement the microprocessor 1100 of FIG. 11. The FPGA circuitry 1200 also includes an array of example logic gate circuitry 1208, a plurality of example configurable interconnections 1210, and example storage circuitry 1212. The logic gate circuitry 1208 and interconnections 1210 are configurable to instantiate one or more operations that may correspond to at least some of the machine readable instructions of FIGS. 6, 7, and/or 8 and/or other desired operations. The logic gate circuitry 1208 shown in FIG. 12 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1208 to enable configuration of the electrical structures and/or the logic gates to form circuits to perform desired operations. The logic gate circuitry 1208 may include other electrical structures such as look-up tables (LUTs), registers (e.g., flip-flops or latches), multiplexers, etc.

The interconnections 1210 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1208 to program desired logic circuits.

The storage circuitry 1212 of the illustrated example is structured to store result(s) of the one or more of the operations performed by corresponding logic gates. The storage circuitry 1212 may be implemented by registers or the like. In the illustrated example, the storage circuitry 1212 is distributed amongst the logic gate circuitry 1208 to facilitate access and increase execution speed.

The example FPGA circuitry 1200 of FIG. 12 also includes example Dedicated Operations Circuitry 1214. In this example, the Dedicated Operations Circuitry 1214 includes special purpose circuitry 1216 that may be invoked to implement commonly used functions to avoid the need to program those functions in the field. Examples of such special purpose circuitry 1216 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1200 may also include example general purpose programmable circuitry 1218 such as an example CPU 1220 and/or an example DSP 1222. Other general purpose programmable circuitry 1218 may additionally or alternatively be present such as a GPU, an XPU, etc., that can be programmed to perform other operations.

Although FIGS. 11 and 12 illustrate two example implementations of the processor circuitry 912 of FIG. 9 and/or the processor circuitry 1012 of FIG. 10, many other approaches are contemplated. For example, as mentioned above, modern FPGA circuitry may include an on-board CPU, such as one or more of the example CPU 1220 of FIG. 12. Therefore, the processor circuitry 912 of FIG. 9 and/or the processor circuitry 1012 of FIG. 10 may additionally be implemented by combining the example microprocessor 1100 of FIG. 11 and the example FPGA circuitry 1200 of FIG. 12. In some such hybrid examples, a first portion of the machine readable instructions represented by the flowcharts of FIGS. 6, 7, and/or 8 may be executed by one or more of the cores 1102 of FIG. 11 and a second portion of the machine readable instructions represented by the flowcharts of FIGS. 6, 7, and/or 8 may be executed by the FPGA circuitry 1200 of FIG. 12.

In some examples, the processor circuitry 912 of FIG. 9 and/or the processor circuitry 1012 of FIG. 10 may be in one or more packages. For example, the processor circuitry 1100 of FIG. 11 and/or the FPGA circuitry 1200 of FIG. 12 may be in one or more packages. In some examples, an XPU may be implemented by the processor circuitry 912 of FIG. 9 and/or the processor circuitry 1012 of FIG. 10, which may be in one or more packages. For example, the XPU may include a CPU in one package, a DSP in another package, a GPU in yet another package, and an FPGA in still yet another package.

Figure 13:
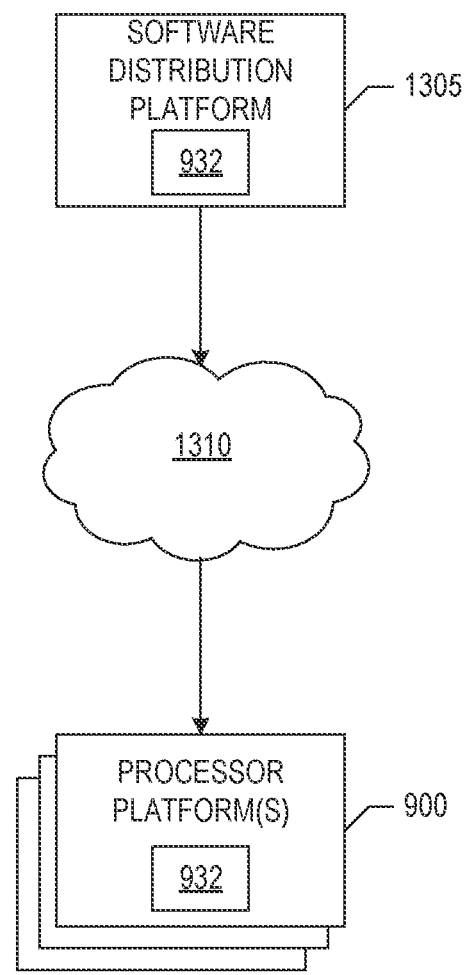
FIG. 13 is a block diagram of an example software distribution platform (e.g., one or more servers) to distribute software (e.g., software corresponding to the example machine readable instructions of FIGS. 6 and/or 7) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1305 to distribute software such as the example machine readable instructions 932 of FIG. 9 to hardware devices owned and/or operated by third parties is illustrated in FIG. 13. The example software distribution platform 1305 may be implemented by any computer server, data facility, cloud service, etc., capable of storing and transmitting software to other computing devices. The third parties may be customers of the entity owning and/or operating the software distribution platform 1305. For example, the entity that owns and/or operates the software distribution platform 1305 may be a developer, a seller, and/or a licensor of software such as the example machine readable instructions 932 of FIG. 9. The third parties may be consumers, users, retailers, OEMs, etc., who purchase and/or license the software for use and/or re-sale and/or sub-licensing. In the illustrated example, the software distribution platform 1305 includes one or more servers and one or more storage devices. The storage devices store the machine readable instructions 932, which may correspond to the example machine readable instructions 600, 700 of FIGS. 6 and/or 7, as described above. The one or more servers of the example software distribution platform 1305 are in communication with a network 1310, which may correspond to any one or more of the Internet and/or any of the example networks 926 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 932 from the software distribution platform 1305. For example, the software, which may correspond to the example machine readable instructions 600, 700 of FIGS. 6 and/or 7, may be downloaded to the example processor platform 900, which is to execute the machine readable instructions 932 to implement the image control circuitry 102. In some example, one or more servers of the software distribution platform 1305 periodically offer, transmit, and/or force updates to the software (e.g., the example machine readable instructions 932 of FIG. 9) to ensure improvements, patches, updates, etc., are distributed and applied to the software at the end user devices.

From the foregoing, it will be appreciated that example systems, methods, apparatus, and articles of manufacture have been disclosed that provide for dynamic selection of a video stream from two or more cameras based on orientation of a user relative to the cameras to be output during, for instance, a video conference in which a user is interacting with two or more devices. Examples disclosed herein determine, based on execution of neural network-trained model(s), orientations of a face of the user relative to the two or more cameras associated with devices as represented by, for instance, a yaw angle of a facial feature (e.g., a nose) in the image data. Examples disclosed herein automatically switch between video streams based on changes in orientation of the user relative to the camera(s), thereby providing for video outputs in which the user is facing or substantially facing forward as the user interactions with the different devices.

Disclosed systems, methods, apparatus, and articles of manufacture improve the efficiency of using a computing device by using image data generated as part of a video conference to determine user orientation and select the video stream that presents the user as substantially forward-facing, rather than using a separate proximity sensors or other hardware. Examples disclosed herein also provide for attention scoring to determine whether the user is engaged with a particular device and, thus, a corresponding camera to provide for efficient selection of a video stream and to prevent false positive that would otherwise result in switching between video streams when the user is only momentarily engaged with a device. Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture for camera image stream selection for electronic user devices are disclosed herein. Further examples and combinations thereof include the following:

Example 1 includes an apparatus including head pose estimation circuitry to determine, based on first image data and second image data, (a) a first orientation of a user relative to a first camera and (b) a second orientation of the user relative to a second camera, the first image data associated with a first video stream output by the first camera and the second image data associated with a second video stream output by the second camera, and video stream selection circuitry to select one of the first video stream or the second video stream for output based on the first orientation and the second orientation.

Example 2 includes the apparatus of example 1, wherein the head pose estimation circuitry is to determine the first orientation based on a first yaw angle of a portion of a face of the user relative to the first camera, and determine the second orientation based on a second yaw angle of a portion of the face of the user relative to the second camera.

Example 3 includes the apparatus of examples 1 or 2, further including attention score generation circuitry to determine a first attention score for the first camera based on the first yaw angle, and determine a second attention score for the second camera based on the second yaw angle, the video stream selection circuitry to select the one of the first video stream or the second video stream based on the first attention score and the second attention score.

Example 4 includes the apparatus of any of examples 1-3, wherein the attention score generation circuitry is to determine the first attention score based on (a) a comparison of the first yaw angle to a threshold yaw angle and (b) a duration for which the first yaw angle satisfies the threshold yaw angle, and determine the second attention score based on (c) a comparison of the second yaw angle to the threshold yaw angle and (d) a duration for which the second yaw angle satisfies the threshold yaw angle.

Example 5 includes the apparatus of any of examples 1-4, wherein the video stream selection circuitry is to perform a comparison of the first attention score to an attention detection threshold, perform a comparison of the second attention score to the attention detection threshold, and in response to determining that each of the first attention score and the second attention score satisfies the attention detection threshold, select the one of the first video stream or the second video stream corresponding to a lesser one of the first yaw angle or the second yaw angle.

Example 6 includes the apparatus of any of examples 1-5, wherein the video stream selection circuitry is to select the first video stream in response to determining that the first attention score and the second attention score do not satisfy the attention detection threshold.

Example 7 includes the apparatus of any of examples 1-6, further including face detection circuitry to detect, using a neural network, a face of the user in the first image data and the second image data.

Example 8 includes the apparatus of any of examples 1-7, wherein the head pose estimation circuitry is to determine (a) the first orientation based on a facial feature in the detected face in the first image data and (b) the second orientation based on the facial feature in the detected face in the second image data.

Example 9 includes a non-transitory computer readable medium comprising instructions that, when executed, cause processor circuitry to at least determine, based on a first video frame and a second video frame, (a) a first orientation of a face of a user relative to a first camera and (b) a second orientation of the face of the user relative to a second camera, the first video frame output by the first camera and the second video frame output by the second camera, select one of a first video stream generated by the first camera or a second video stream generated by the second camera based on the first orientation and the second orientation, the first video stream including the first video frame and the second video stream including the second video frame, and cause the selected one of the first video stream or the second video stream to be output for presentation.

Example 10 includes the non-transitory computer readable medium of example 9, wherein the instructions, when executed, cause the processor circuitry to determine the first orientation based on a first yaw angle of a portion of the face of the user relative to the first camera, and determine the second orientation based on a second yaw angle of the portion of the face of the user relative to the second camera.

Example 11 includes the non-transitory computer readable medium of examples 9 or 10, wherein the instructions, when executed, cause the processor circuitry to determine a first attention score for the first camera based on the first yaw angle, and determine a second attention score for the second camera based on the second yaw angle, the processor circuitry to select the one of the first video stream or the second video stream based on the first attention score and the second attention score.

Example 12 includes the non-transitory computer readable medium of any of examples 9-11, wherein the instructions, when executed, cause the processor circuitry to determine the first attention score based on a comparison of the first yaw angle to a threshold yaw angle, and determine the second attention score based on a comparison of the second yaw angle to the threshold yaw angle.

Example 13 includes the non-transitory computer readable medium of any of examples 9-12, wherein the instructions, when executed, cause the processor circuitry to further determine the first attention score based on a duration for which the first yaw angle satisfies the threshold yaw angle.

Example 14 includes the non-transitory computer readable medium of any of examples 9-12, wherein the instructions, when executed, cause the processor circuitry to perform a comparison of the first attention score to an attention detection threshold, perform a comparison of the second attention score to the attention detection threshold, and in response to determining that each of the first attention score and the second attention score satisfies the attention detection threshold, select the one of the first video stream or the second video stream corresponding to a lesser one of the first yaw angle or the second yaw angle.

Example 15 includes the non-transitory computer readable medium of any of examples 9-14, wherein the instructions, when executed, cause the processor circuitry to select the first video stream in response to determining that the first attention score and the second attention score do not satisfy the attention detection threshold.

Example 16 includes the non-transitory computer readable medium of any of examples 9-15, wherein the instructions, when executed, cause the processor circuitry to detect, using a neural network, the face of the user in the first video frame and the second video frame.

Example 17 includes the non-transitory computer readable medium of any of examples 9-16, wherein the instructions, when executed, cause the processor circuitry to determine (a) the first orientation based on a facial feature in the detected face in the first video frame and (b) the second orientation based on the facial feature in the detected face in the second video frame.

Example 18 includes an apparatus including memory, instructions stored in the apparatus, and processor circuitry to execute the instructions to at least determine, based on first image data and second image data, (a) a first orientation of a user relative to a first camera and (b) a second orientation of the user relative to a second camera, the first image data associated with a first video stream output by the first camera and the second image data associated with a second video stream output by the second camera, and select one of the first video stream or the second video stream based on the first orientation and the second orientation as a video stream output.

Example 19 includes the apparatus of example 18, wherein the processor circuitry is to execute the instructions to determine the first orientation based on a first yaw angle of a portion of a face of the user relative to the first camera, and determine the second orientation based on a second yaw angle of a portion of the face of the user relative to the second camera.

Example 20 includes the apparatus of example 18 or 19, wherein the processor circuitry is to execute the instructions to assign a first attention score to the user relative to the first camera based on the first yaw angle, and assign a second attention score to the user relative to the second camera based on the second yaw angle, the processor circuitry to select the one of the first video stream or the second video stream based on the first attention score and the second attention score.

Example 21 includes the apparatus of any of examples 18-20, wherein the processor circuitry is to execute the instructions to determine the first attention score based on (a) a comparison of the first yaw angle to a threshold yaw angle and (b) a duration for which the first yaw angle satisfies the threshold yaw angle, and determine the second attention score based on (c) a comparison of the second yaw angle to the threshold yaw angle and (d) a duration for which the second yaw angle satisfies the threshold yaw angle.

Example 22 includes the apparatus of any of examples 18-21, wherein the processor circuitry is to execute the instructions to perform a comparison of the first attention score to an attention detection threshold, perform a comparison of the second attention score to the attention detection threshold, and in response to determining that each of the first attention score and the second attention score satisfies the attention detection threshold, select the one of the first video stream or the second video stream corresponding to a lesser one of the first yaw angle or the second yaw angle.

Example 23 includes the apparatus of any of examples 18-22, wherein the processor circuitry is to execute the instructions to select the first camera in response to determining that the first attention score and the second attention score do not satisfy the attention detection threshold.

Example 24 includes the apparatus of any of examples 18-23, wherein the processor circuitry is to execute the instructions to detect, using a neural network, a face of the user in the first image data and the second image data.

Example 25 includes the apparatus of any of examples 18-24, wherein the processor circuitry is to execute the instructions to determine (a) the first orientation based on a facial feature in the detected face in the first image data and (b) the second orientation based on the facial feature in the detected face in the second image data.

Example 26 includes an apparatus including means for pose estimating to determine, based on first image data and second image data, (a) a first orientation of a facial feature of a user relative to a first camera and (b) a second orientation of the facial feature of the user relative to a second camera, the first image data associated with a first video stream output by the first camera and the second image data associated with a second video stream output by the second camera, and means for selecting to select one of the first video stream or the second video stream for output based on the first orientation and the second orientation.

Example 27 includes the apparatus of example 26, wherein the means for pose estimating is to determine the first orientation based on a first yaw angle of the facial feature relative to the first camera, and determine the second orientation based on a second yaw angle of the facial feature relative to the second camera.

Example 28 includes the apparatus of example 26 or 27, further including means for score generating to determine a first attention score for the first camera based on the first yaw angle, and determine a second attention score for the second camera based on the second yaw angle, the means for selecting to select the one of the first video stream or the second video stream based on the first attention score and the second attention score.

Example 29 includes the apparatus of any of examples 26-28, wherein the means for score generating is to determine the first attention score based on a comparison of the first yaw angle to a threshold yaw angle, and determine the second attention score based on a comparison of the second yaw angle to the threshold yaw angle.

Example 30 includes the apparatus of any of examples 26-29, wherein the means for score generating is to further determine the first attention score based on a duration for which the first yaw angle satisfies the threshold yaw angle.

Example 31 includes the apparatus of any of examples 26-29, wherein the means for selecting is to perform a comparison of the first attention score to an attention detection threshold, perform a comparison of the second attention score to the attention detection threshold, and in response to determining that each of the first attention score and the second attention score satisfies the attention detection threshold, select the one of the first video stream or the second video stream corresponding to a lesser one of the first yaw angle or the second yaw angle.

Example 32 includes the apparatus of any of examples 26-31, wherein the means for selecting is to select the first video stream in response to determining that the first attention score and the second attention score do not satisfy the attention detection threshold.

Example 33 includes the apparatus of any of examples 26-32, further including means for detecting to detect, using a neural network, a face of the user in the first image data and the second image data.

Example 34 includes a method including determining, based on first image data and second image data, (a) a first orientation of a user relative to a first camera and (b) a second orientation of the user relative to a second camera, the first image data associated with a first video stream output by the first camera and the second image data associated with a second video stream output by the second camera, and selecting one of the first video stream or the second video stream for output based on the first orientation and the second orientation.

Example 35 includes the method of example 34, further including determining the first orientation based on a first yaw angle of a portion of a face of the user relative to the first camera, and determining the second orientation based on a second yaw angle of a portion of the face of the user relative to the second camera.

Example 36 includes the method of example 34 or 35, further including determining a first attention score for the user relative to the first camera based on the first yaw angle, determining a second attention score for the user relative to the second camera based on the second yaw angle, and selecting the one of the first video stream or the second video stream based on the first attention score and the second attention score.

Example 37 includes the method of any of examples 34-36, further including determining the first attention score based on (a) a comparison of the first yaw angle to a threshold yaw angle and (b) a duration for which the first yaw angle satisfies the threshold yaw angle, and determining the second attention score based on (c) a comparison of the second yaw angle to the threshold yaw angle and (d) a duration for which the second yaw angle satisfies the threshold yaw angle.

Example 38 includes the method of any of examples 34-37, further including performing a comparison of the first attention score to an attention detection threshold, performing a comparison of the second attention score to the attention detection threshold, and in response to determining that each of the first attention score and the second attention score satisfies the attention detection threshold, selecting the one of the first video stream or the second video stream corresponding to a lesser one of the first yaw angle or the second yaw angle.

Example 39 includes the method of any of examples 34-38, further including selecting the first video stream in response to determining that the first attention score and the second attention score do not satisfy the attention detection threshold.

Example 40 includes the method of any of examples 34-39, further including detecting, using a neural network, a face of the user in the first image data and the second image data.

Example 41 includes the method of any of examples 34-40, further including determining (a) the first orientation based on a facial feature in the detected face in the first image data and (b) the second orientation based on the facial feature in the detected face in the second image data.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. A non-transitory computer readable medium comprising machine-readable instructions to cause at least one processor circuit to at least:
   determine, based on a first video frame and a second video frame, (a) a first orientation of at least a portion of a face of a user relative to a first camera at a first time and (b) a second orientation of the at least the portion of the face of the user relative to a second camera at the first time, the first video frame output by the first camera and the second video frame output by the second camera;
   detect, based on the first orientation and the second orientation, that the user is oriented toward the first camera for a first duration and is not oriented toward the second camera for the first duration;
   in response to determining that the user is oriented toward the first camera for the first duration, increment a first attention score associated with the first camera to generate an adjusted first attention score;
   in response to determining that the user is not oriented toward the second camera for the first duration, reduce a second attention score associated with the second camera to generate an adjusted second attention score;
   select one of a first video stream generated by the first camera or a second video stream generated by the second camera based on the adjusted first attention score and the adjusted second attention score, the first video stream including the first video frame and the second video stream including the second video frame; and
   cause the selected one of the first video stream or the second video stream to be output for presentation.

2. The non-transitory computer readable medium of claim 1, wherein the machine-readable instructions are to cause one or more of the at least one processor circuit to:
   determine the first orientation based on a first yaw angle of the at least the portion of the face of the user relative to the first camera; and
   determine the second orientation based on a second yaw angle of the at least the portion of the face of the user relative to the second camera.

3. The non-transitory computer readable medium of claim 1, wherein the machine-readable instructions are to cause one or more of the at least one processor circuit to:
   determine the first attention score for the first camera based on a third yaw angle of the at least the portion of the face of the user relative to the first camera at a second time, the second time before the first time; and
   determine the second attention score for the second camera based on a fourth yaw angle of the at least the portion of the face of the user relative to the second camera at the second time.

4. The non-transitory computer readable medium of claim 3, wherein the instructions, when executed, cause the at least one processor circuitry circuit to:
   determine the first attention score based on a comparison of the first third yaw angle to a threshold yaw angle; and
   determine the second attention score based on a comparison of the fourth yaw angle to the threshold yaw angle.

5. The non-transitory computer readable medium of claim 2, wherein the machine-readable instructions are to cause one or more of the at least one processor circuit to further determine the adjusted first attention score based on a duration for which the first yaw angle satisfies a threshold yaw angle.

6. The non-transitory computer readable medium of claim 2, wherein the machine-readable instructions are to cause one or more of the at least one processor circuit to:
   perform a comparison of the adjusted first attention score to an attention detection threshold;

perform a comparison of the adjusted second attention score to the attention detection threshold; and in response to determining that each of the adjusted first attention score and the adjusted second attention score satisfies the attention detection threshold, select the one of the first video stream or the second video stream corresponding to a lesser one of the first yaw angle or the second yaw angle.

7. The non-transitory computer readable medium of claim 6, wherein the machine-readable instructions are to cause one or more of the at least one processor circuit to select the first video stream in response to determining that the adjusted first attention score and the adjusted second attention score do not satisfy the attention detection threshold.

8. The non-transitory computer readable medium of claim 1, wherein the machine-readable instructions are to cause one or more of the at least one processor circuit to detect, using a neural network, the at least the portion of the face of the user in the first video frame and the second video frame.

9. The non-transitory computer readable medium of claim 8, wherein the machine-readable instructions are to cause one or more of the at least one processor circuit to determine (a) the first orientation based on a facial feature in the at least the portion of the face in the first video frame and (b) the second orientation based on the facial feature in the at least the portion of the face in the second video frame.

10. The non-transitory computer readable medium of claim 1, wherein the machine-readable instructions are to cause one or more of the at least one processor circuit to:

increment the first attention score based on the first duration and an attack factor; and reduce the second attention score based on the first duration and a decay factor, the decay factor less than the attack factor.

11. An apparatus comprising:
memory;
machine-readable instructions stored in the apparatus; and
at least one processor circuit to execute the machine-readable instructions to at least:
determine, based on first image data and second image data, (a) a first yaw angle of at least a portion of a face of a user relative to a first camera at a first time and (b) a second yaw angle of the at least the portion of the face of the user relative to a second camera at the first time, the first image data associated with a first video stream output by the first camera and the second image data associated with a second video stream output by the second camera;
detect, based on the first yaw angle and the second yaw angle, that the user is oriented toward the first camera for a first duration and is not oriented toward the second camera for the first duration;
in response to determining that the user is oriented toward the first camera for the first duration, increment a first attention score associated with the first camera to generate an adjusted first attention score;
in response to determining that the user is not oriented toward the second camera for the first duration, reduce a second attention score associated with the second camera to generate an adjusted second attention score; and
select one of the first video stream or the second video stream based on the adjusted first attention score and the adjusted second attention score as a video stream output.

12. The apparatus of claim 11, wherein one or more of the at least one processor circuit is to execute the machine-readable instructions to:

determine the first attention score based on (a) a comparison of a third yaw angle of the at least the portion of the face of the user relative to the first camera at a second time to a threshold yaw angle and (b) a second duration for which the first third yaw angle satisfies the threshold yaw angle; and determine the second attention score based on (c) a comparison of a fourth yaw angle of the at least the portion of the face of the user relative to the second camera at the second time to the threshold yaw angle and (d) a third duration for which the fourth yaw angle satisfies the threshold yaw angle.

13. The apparatus of claim 11, wherein one or more of the at least one processor circuit is to execute the machine-readable instructions to:

perform a comparison of the adjusted first attention score to an attention detection threshold;

perform a comparison of the adjusted second attention score to the attention detection threshold; and in response to determining that each of the adjusted first attention score and the adjusted second attention score satisfies the attention detection threshold, select the one of the first video stream or the second video stream corresponding to a lesser one of the first yaw angle or the second yaw angle.

14. The apparatus of claim 13, wherein one or more of the at least one processor circuit is to execute the machine-readable instructions to select the first camera in response to determining that the adjusted first attention score and the adjusted second attention score do not satisfy the attention detection threshold.

15. The apparatus of claim 11, wherein one or more of the at least one processor circuit is to execute the machine-readable instructions to detect, using a neural network, the at least the portion of the face of the user in the first image data and the second image data.

16. The apparatus of claim 15, wherein one or more of the at least one processor circuit is to execute the machine-readable instructions to determine (a) the first yaw angle based on a facial feature in the at least the portion of the face in the first image data and (b) the second yaw angle based on the facial feature in the at least the portion of the face in the second image data.

17. The apparatus of claim 11, wherein one or more of the at least one processor circuit is to execute the machine-readable instructions to:

increment the first attention score based on the first duration and an attack factor; and reduce the second attention score based on the first duration and a decay factor, the decay factor less than the attack factor.

18. A method comprising:
determining, based on first image data and second image data, (a) a first orientation of at least a portion of a face of a user relative to a first camera at a first time and (b) a second orientation of the at least the portion of the face of the user relative to a second camera at the first time, the first image data associated with a first video stream output by the first camera and the second image data associated with a second video stream output by the second camera;
determining, based on the first orientation and the second orientation and by at least one processor circuit programmed by at least one instruction, that the user is oriented toward the first camera for a first duration and is not oriented toward the second camera for the first duration;

in response to determining that the user is oriented toward the first camera for the first duration, incrementing a first attention score associated with the first camera to generate an adjusted first attention score;

in response to determining that the user is not oriented toward the second camera for the first duration, reducing a second attention score associated with the second camera to generate an adjusted second attention score; and selecting one of the first video stream or the second video stream for output based on the adjusted first attention score and the adjusted second attention score.

19. The method of claim 18, further including:
determining the first orientation based on a first yaw angle of the at least the portion of the face of the user relative to the first camera; and
determining the second orientation based on a second yaw angle of the at least the portion of the face of the user relative to the second camera.

20. The method of claim 18, further including:
determining the first attention score based on a third yaw angle of the at least the portion of the face of the user relative to the first camera at a second time, the second time before the first time; and
determining the second attention score based on a fourth yaw angle of the at least the portion of the face of the user relative to the second camera at the second time.

21. The method of claim 20, further including:
determining the first attention score based on (a) a comparison of the third yaw angle to a threshold yaw angle and (b) a second duration for which the third yaw angle satisfies the threshold yaw angle; and
determining the second attention score based on (c) a comparison of the fourth yaw angle to the threshold yaw angle and (d) a third duration for which the fourth yaw angle satisfies the threshold yaw angle.

22. The method of claim 19, further including:
performing a comparison of the adjusted first attention score to an attention detection threshold;
performing a comparison of the adjusted second attention score to the attention detection threshold; and
in response to determining that each of the adjusted first attention score and the adjusted second attention score satisfies the attention detection threshold, selecting the one of the first video stream or the second video stream corresponding to a lesser one of the first yaw angle or the second yaw angle.

23. The method of claim 22, further including selecting the first video stream in response to determining that the adjusted first attention score and the adjusted second attention score do not satisfy the attention detection threshold.

24. The method of claim 18, further including detecting, using a neural network, the at least the portion of the face of the user in the first image data and the second image data.

25. The method of claim 24, further including determining (a) the first orientation based on a facial feature in the at least the portion of the face in the first image data and (b) the second orientation based on the facial feature in the at least the portion of the face in the second image data.

* * * * *